US012766987B2

(12) United States Patent
Yang et al.

(10) Patent No.: US 12,766,987 B2
(45) Date of Patent: Oct. 20, 2026

(54) CHARGING SYSTEM

(71) Applicant: CONTEMPORARY AMPEREX TECHNOLOGY CO., LIMITED, Ningde (CN)

(72) Inventors: Le Yang, Ningde (CN); Qing Li, Ningde (CN); Yanqing Xing, Ningde (CN); Pengmin Wang, Ningde (CN); Kaiwen Zhang, Ningde (CN); Dongxu Yu, Ningde (CN); Zhonghong Li, Ningde (CN); Kai Wu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/174,515

(22) Filed: Apr. 9, 2025

(65) Prior Publication Data

US 2026/0145561 A1 May 28, 2026

Related U.S. Application Data

(63) Continuation of application No. PCT/CN2024/134264, filed on Nov. 25, 2024.

(51) Int. Cl.
*B60L 53/302* (2019.01)
*B60L 53/53* (2019.01)

(52) U.S. Cl.
CPC ............. *B60L 53/302* (2019.02); *B60L 53/53* (2019.02)

(58) Field of Classification Search
CPC ..................................................... B60L 53/302
See application file for complete search history.

(56) References Cited

U.S. PATENT DOCUMENTS 4,007,315 A * 2/1977 Brinkmann ......... H01M 10/653 429/62
2020/0171967 A1 6/2020 Gohla-Neudecker et al.
2024/0255196 A1* 8/2024 Hu ........................ H02J 7/0042

FOREIGN PATENT DOCUMENTS

CN 114801809 A 7/2022
CN 115810772 A * 3/2023

(Continued)

OTHER PUBLICATIONS

The World Intellectual Property Organization (WIPO) International Search Report for PCT/CN2024/134264 Apr. 17, 2025 6 Pages (including translation).

(Continued)

*Primary Examiner* — Julian D Huffman
*Assistant Examiner* — John P Ondrasik
(74) *Attorney, Agent, or Firm* — ANOVA LAW GROUP, PLLC

(57) ABSTRACT

A charging system for charging a power battery of a vehicle includes a battery apparatus configured to store energy and charge the power battery by releasing energy; a charging connector configured to connect to the vehicle so as to charge the power battery via the charging connector; and a thermal management system, including a first heat exchange flow path, a second heat exchange flow path, and a first switching mechanism. The first heat exchange flow path includes a first heat exchanger configured to exchange heat with the battery apparatus. The second heat exchange flow path includes a second heat exchanger configured to exchange heat with the charging connector. The second heat exchange flow path is connected to the first heat exchange flow path via the first switching mechanism.

17 Claims, 11 Drawing Sheets

(56) References Cited

FOREIGN PATENT DOCUMENTS

| | | | | | |
|---|---|---|---|---|---|
| CN | 116424125 | A | * | 7/2023 | ............ B60L 53/302 |
| CN | 116803742 | A | * | 9/2023 | ............ B60L 53/302 |
| CN | 116901767 | A | * | 10/2023 | .............. B60L 53/60 |
| CN | 118144599 | A | * | 6/2024 | ............ B60L 53/302 |
| CN | 221819895 | U | | 10/2024 | |
| DE | 102020125512 | A1 | * | 3/2022 | |
| WO | WO-2025044136 | A1 | * | 3/2025 | |
| WO | WO-2025066429 | A1 | * | 4/2025 | |

OTHER PUBLICATIONS

The European Patent Office (EPO) The Extended European Search Report for Application No. 24855113.7 Jan. 29, 2026 9 Pages.

* cited by examiner

CHARGING SYSTEM

CROSS-REFERENCE TO RELATED APPLICATION

This application is a continuation of International Application No. PCT/CN 2024/134264, filed on Nov. 25, 2024, the entire content of which is incorporated herein by reference.

TECHNICAL FIELD

This disclosure relates to the field of charging technologies, and in particular, to a charging system.

BACKGROUND

With increasing environmental pollution, the new energy industry has attracted growing attention. For the new energy industry, battery technologies are an important factor in connection with its development. Active materials in rechargeable batteries can be reactivated for continued use by charging after discharge, enabling them to have broad application prospects in fields such as electric vehicles. Electric vehicles are powered by batteries and require frequent charging. Charging stations can charge the batteries of electric vehicles, and how to perform better thermal management on charging stations has become an important research direction.

SUMMARY

According to an aspect of this disclosure, a charging system is provided for charging a power battery of a vehicle, including:

- a battery apparatus configured to store energy and charge the power battery by releasing energy;
- a charging connector configured to connect to the vehicle so as to charge the power battery via the charging connector; and
- a thermal management system, including a first heat exchange flow path, a second heat exchange flow path, and a first switching mechanism; where
- the first heat exchange flow path includes a first heat exchanger configured to exchange heat with the battery apparatus, the second heat exchange flow path includes a second heat exchanger configured to exchange heat with the charging connector, and the second heat exchange flow path is connected to the first heat exchange flow path via the first switching mechanism, so that through an operation of switching the first switching mechanism, the second heat exchange flow path and the first heat exchange flow path become communicated with each other via the first switching mechanism or a communication relationship between the second heat exchange flow path and the first heat exchange flow path via the first switching mechanism is disconnected.

In this embodiment, the charging system for charging a power battery of a vehicle has a charging connector and a battery apparatus, which can store energy through the battery apparatus when power demand or electricity price is low so that it is used for charging the power battery when power demand or electricity price is high, thereby reducing the operating cost of the charging system and reducing the burden on the power grid. For this kind of charging system, the first heat exchange flow path and the second heat exchange flow path are provided to perform heat exchange with the battery apparatus and the charging connector respectively through the first heat exchanger and the second heat exchanger, and an operation of switching the first switching mechanism is performed to connect or disconnect a communication relationship between the second heat exchange flow path with the first heat exchange flow path via the first switching mechanism, so as to form different heat exchange loops according to the needs, thereby effectively meeting the thermal management requirements of the charging connector and the battery apparatus.

In some embodiments, the charging system further includes:

- a first power conversion module connected to the battery apparatus and exchanging heat with the first heat exchanger; and/or
- a second power conversion module connected to the charging connector and exchanging heat with the second heat exchanger.

In this embodiment, either the first power conversion module or the second power conversion module generates heat during operation. Through heat exchange between the first heat exchanger and the first power conversion module, as well as heat exchange between the second heat exchanger and the second power conversion module, the modules can achieve longer operating times and lifespans.

In some embodiments, the thermal management system further includes a compression refrigeration circulation loop and a third switching mechanism, where the compression refrigeration circulation loop includes an evaporator, the evaporator further includes an internal heat exchange flow path, and the internal heat exchange flow path is connected to the first heat exchange flow path via the third switching mechanism so that through an operation of switching the third switching mechanism, the internal heat exchange flow path and the first heat exchange flow path become communicated with each other via the third switching mechanism or a communication relationship between the internal heat exchange flow path and the first heat exchange flow path via the third switching mechanism is disconnected.

In this embodiment, through an operation of switching the third switching mechanism, the internal heat exchange flow path and the first heat exchange flow path become communicated with each other via the third switching mechanism, or the communication relationship between the internal heat exchange flow path and the first heat exchange flow path via the third switching mechanism is disconnected, thereby utilizing the compression refrigeration circulation loop to improve the thermal management efficiency achieved by the first heat exchange flow path. In addition, through an operation of switching the third switching mechanism, different heat exchange medium circulation loops can be formed, thereby increasing the flexibility of configuration for different thermal management requirements.

In some embodiments, the first heat exchange flow path is configured as, when the third switching mechanism is switched to a communicated state, at least part of the first heat exchange flow path forms a heat exchange loop with the internal heat exchange flow path.

In this embodiment, through an operation of switching the third switching mechanism, the internal heat exchange flow path and the first heat exchange flow path become communicated with each other via the third switching mechanism, which allows at least part of the first heat exchange flow path forms a heat exchange medium circulation loop with the internal heat exchange flow path. In addition, when the compression refrigeration circulation loop is activated, the cooling capacity generated by the compression refrigeration circulation loop is provided to the first heat exchange flow path through the heat exchange between the refrigerant circulating in the compression refrigeration circulation loop and the heat exchange medium flowing through the internal heat exchange flow path. Since the compression refrigeration circulation loop can achieve high cooling efficiency, the cooling capacity transferred from the compression refrigeration circulation loop to the first heat exchange flow path can effectively reduce the temperature of the heat exchange medium flowing in the first heat exchange flow path, thereby improving the cooling capacity of the loop where the first heat exchange flow path is located, which is conducive to enhancing the thermal management efficiency achieved by the first heat exchange flow path.

In some embodiments, the third switching mechanism and the first switching mechanism, which are communicated with each other, are each implemented independently by a switching valve, or jointly implemented by a three-way liquid valve.

In this embodiment, the third switching mechanism and the first switching mechanism, which are communicated with each other, can each be implemented independently by a switching valve, which can improve the control independence of each switching mechanism and facilitate maintenance; alternatively, they can be jointly implemented by a three-way liquid valve, which is conducive to simplifying the pipeline layout to save space and cost and is beneficial to simplifying the control logic to enhance control reliability.

In some embodiments, the thermal management system further includes a third heat exchange flow path, where the third heat exchange flow path further includes a third heat exchanger, the third heat exchange flow path is connected in parallel with the second heat exchange flow path, and is connected to the first heat exchange flow path via the first switching mechanism so that through an operation of switching the first switching mechanism, the third heat exchange flow path and the first heat exchange flow path become communicated with each via the first switching mechanism or a communication relationship between the third heat exchange flow path and the first heat exchange flow path via the first switching mechanism is disconnected.

In this embodiment, the third heat exchange flow path containing the third heat exchanger is connected in parallel with the second heat exchange flow path, and is connected to the first heat exchange flow path via the first switching mechanism. Thus, through an operation of switching the first switching mechanism, different heat exchange medium circulation loops can be formed according to different thermal management requirements.

In some embodiments, the first heat exchange flow path is configured as, when the first switching mechanism is switched to a communicated state, at least part of the first heat exchange flow path forms a heat exchange loop with the third heat exchange flow path.

When the first switching mechanism is switched to a communicated state, the third heat exchange flow path and the first heat exchange flow path become communicated with each other via the first switching mechanism, so that the heat exchange medium in the first heat exchange flow path can flow into the third heat exchange flow path to exchange heat through the third heat exchanger. In this way, another circulation loop containing at least part of the first heat exchange flow path and the third heat exchange flow path (or further including the second heat exchange flow path) can be formed to meet the thermal management requirements of the battery apparatus and the charging connector.

In some embodiments, the third heat exchanger includes a natural cooling heat exchanger.

In this embodiment, a natural cooling heat exchanger is provided in the third heat exchange flow path, where the natural cooling heat exchanger can participate in the natural heat exchange between the heat exchange medium in the thermal management system and the outside in some operating modes of the thermal management system, thus further reducing system energy consumption.

In some embodiments, the thermal management system further includes a compression refrigeration circulation loop and a third switching mechanism, the compression refrigeration circulation loop includes a condenser and an evaporator, the evaporator further includes an internal heat exchange flow path, and the internal heat exchange flow path is connected to the first heat exchange flow path via the third switching mechanism; and the thermal management system further includes a fan, and the fan acts on the condenser and the third heat exchanger.

In this embodiment, the compression refrigeration circulation loop and the third heat exchange flow path can provide different levels of cooling capacities, consuming different amounts of energy. Under different working conditions, operations of switching the first switching mechanism and the third switching mechanism can be performed as needed to meet the requirements of improving thermal management efficiency or reducing energy consumption, thereby enhancing the adaptability of the thermal management system to the working conditions.

In some embodiments, the thermal management system further includes a cold storage flow path and a second switching mechanism, where the cold storage flow path includes a cold storage container, the cold storage container is configured to store and release cooling capacity, and the cold storage flow path is connected to the first heat exchange flow path via the second switching mechanism so that through an operation of switching the second switching mechanism, the cold storage flow path and the first heat exchange flow path become communicated with each other via the second switching mechanism or a communication relationship between the cold storage flow path and the first heat exchange flow path via the second switching mechanism is disconnected.

In this embodiment, through the second switching mechanism, the cold storage flow path containing the cold storage container is connected to the first heat exchange flow path, allowing the cold storage container to accumulate cooling capacity. This enables the cooling capacity to be released to meet cooling needs in thermal management requirement scenarios where the battery apparatus and the like require rapid cooling, thereby improving the reliability of the operation of the charging system operation and reducing system energy consumption.

In some embodiments, the first heat exchange flow path further includes a first pump, and the thermal management system further includes a heat exchange bypass and a fourth switching mechanism, where the first heat exchanger is connected in parallel with the heat exchange bypass, one end of the heat exchange bypass is connected to an inlet of the first pump, and another end is connected to the first heat exchange flow path via the fourth switching mechanism so that through an operation of switching the fourth switching mechanism, the heat exchange bypass and the first heat exchange flow path become communicated with each other via the fourth switching mechanism or a communication relationship between the heat exchange bypass and the first heat exchange flow path via the fourth switching mechanism is disconnected.

In this embodiment, the first pump can drive the flow in the first heat exchange flow path, forming a circulation loop when the first heat exchange flow path and another flow path are communicated with each other. One end of the heat exchange bypass is connected to the inlet of the first pump. When the fourth switching mechanism is switched to communicate the heat exchange bypass with the first heat exchange flow path via the fourth switching mechanism, the first pump can drive the heat exchange medium to flow through the heat exchange bypass to meet the needs of reducing flow resistance and simplifying the circulation loop in some working conditions.

In some embodiments, the cold storage flow path is configured as, when the second switching mechanism and the fourth switching mechanism are both switched to a communicated state, the cold storage flow path, the heat exchange bypass, and a part of the first heat exchange flow path excluding the first heat exchanger form a heat exchange loop; or, when the second switching mechanism is switched to a communicated state and the fourth switching mechanism is switched to a disconnected state, the cold storage flow path and a part of the first heat exchange flow path containing the first heat exchanger form a heat exchange loop.

In this embodiment, depending on the operations of switching the second switching mechanism and the fourth switching mechanism, the circulation loop where the cold storage flow path is located can either flow through or bypass the first heat exchanger, thereby meeting different thermal management requirements.

In some embodiments, the first switching mechanism, the second switching mechanism, and the fourth switching mechanism, which are communicated with each other, are each implemented independently by a switching valve, or jointly implemented by a four-way liquid valve.

In this embodiment, the first switching mechanism, the second switching mechanism, and the fourth switching mechanism, which are communicated with each other, can each be implemented independently by a switching valve, which can improve the control independence of each switching mechanism and facilitate maintenance; alternatively, they can be jointly implemented by a four-way liquid valve, which is conducive to simplifying the pipeline layout to save space and cost and is beneficial to simplifying the control logic to enhance control reliability.

In some embodiments, the thermal management system further includes the compression refrigeration circulation loop and the third switching mechanism, where the compression refrigeration circulation loop includes the evaporator, the evaporator further includes the internal heat exchange flow path, and the internal heat exchange flow path is connected to the first heat exchange flow path via the third switching mechanism, where the first switching mechanism, the second switching mechanism, the third switching mechanism, and the fourth switching mechanism, which are communicated with each other, are each implemented independently by a switching valve, or jointly implemented by a three-way liquid valve and a four-way liquid valve which are connected in series.

In this embodiment, the first switching mechanism, the second switching mechanism, the third switching mechanism, and the fourth switching mechanism, which are communicated with each other, can each be implemented independently by a switching valve, which can improve the control independence of each switching mechanism and facilitate maintenance; alternatively, they can be jointly implemented by a three-way liquid valve and a four-way liquid valve connected in series, which is conducive to simplifying the pipeline layout to save space and cost and is beneficial to simplifying the control logic to enhance control reliability.

In some embodiments, the first heat exchange flow path further includes a heater, and the heater is configured to heat a heat exchange medium flowing through the heater when a heating function is enabled.

In this embodiment, through the heating of the heat exchange medium by the heater, the temperature of the battery apparatus can be increased through the first heat exchanger when the temperature of the battery apparatus is low.

In some embodiments, the second heat exchange flow path further includes a second pump.

In this embodiment, with a second pump provided in the second heat exchange flow path, the second heat exchange flow path can achieve active driving of the heat exchange medium, so as to form a circulation loop with another heat exchange flow path as needed to meet the cooling requirements of the charging connector.

BRIEF DESCRIPTION OF DRAWINGS

The drawings that form part of the specification describe the embodiments of this disclosure and, together with the specification, are used to explain the principles of this disclosure.

Refer to the drawings. A clearer understanding of this disclosure can be obtained from the following detailed description, in which.

Figure 1:
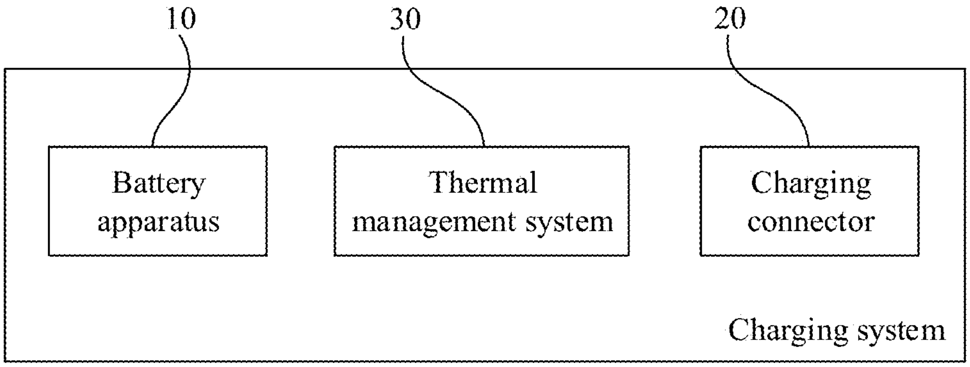
FIG. 1 is a schematic structural diagram according to some embodiments of a charging system of this disclosure.

It should be understood that sizes of various parts shown in the accompanying drawings are not necessarily drawn to scale. Additionally, the same or like reference signs denote the same or like components.

The reference signs respectively represent:

10—battery apparatus; 11—first power conversion module;

20—charging connector; 21—second power conversion module;

30—thermal management system; 31—first heat exchange flow path; 311—first heat exchanger; 312—heater; 313—first pump; 32—second heat exchange flow path; 321—second heat exchanger; 322—second pump;

331—first switching mechanism; 332—second switching mechanism; 333—third switching mechanism; 334—fourth switching mechanism;

34—cold storage flow path; 341—cold storage container;

35—compression refrigeration circulation loop; 351—compressor; 352—condenser; 353—throttling apparatus; 354—evaporator; 3541—internal heat exchange flow path;

36—third heat exchange flow path; 361—third heat exchanger; 3611—natural cooling heat exchanger;

37—fan; and 38—heat exchange bypass.

DESCRIPTION OF EMBODIMENTS

The following describes in detail the embodiments of technical solutions of this disclosure with reference to the accompanying drawings. The following embodiments are merely used to describe technical solutions of this disclosure more explicitly, and therefore they are merely used as examples and do not constitute any limitations on the protection scope of this disclosure.

Unless otherwise defined, all technical and scientific terms used in this disclosure shall have the same meanings as commonly understood by those skilled in the art to which this disclosure relates. The terms used in this disclosure are intended to merely describe the specific embodiments rather than to limit this disclosure. The terms "include", "comprise", and "have" and any other variations thereof in the specification, claims and brief description of drawings of this disclosure are intended to cover non-exclusive inclusions.

In the description of the embodiments of this disclosure, the terms "first", "second", and the like are merely intended to distinguish between different objects, and shall not be understood as any indication or implication of relative importance or any implicit indication of the number, sequence or primary-secondary relationship of the technical features indicated. In the description of the embodiments of this disclosure, "a plurality of" means at least two unless otherwise specifically stated.

In this disclosure, reference to "embodiment" means that specific features, structures or characteristics described with reference to the embodiment may be incorporated in at least one embodiment of this disclosure. The word "embodiment" appearing in various positions in the specification does not necessarily refer to the same embodiment or an independent or alternative embodiment that is exclusive of other embodiments. Persons skilled in the art explicitly and implicitly understand that the embodiments described in this disclosure may combine with another embodiment.

In the description of the embodiments of this disclosure, the term "and/or" is only an associative relationship for describing associated objects, indicating that three relationships may be present. For example, A and/or B may indicate the following three cases: presence of only A, presence of both A and B, and presence of only B. In addition, in this disclosure, if the character "/" appears, it generally indicates an "or" relationship between contextually associated objects. In this disclosure, unless otherwise specified, phrases like "at least one of A, B, and C" and "at least one of A, B, or C" both mean only A, only B, only C, or any combination of A, B, and C.

In the description of the embodiments of this disclosure, the term "a plurality of" means more than two (inclusive). Similarly, "a plurality of groups" means more than two (inclusive) groups, and "a plurality of pieces" means more than two (inclusive) pieces.

In the description of the embodiments of this disclosure, the term "at least one" means one or more than one (inclusive). Similarly, "at least one group" means one group or more than one (inclusive) groups, and "at least one piece" means one piece or more than one (inclusive) pieces. In the description of the embodiments of this disclosure, the term "at least part" means part or all.

Unless otherwise specified, in the description of the embodiments of this disclosure, the orientations or positional relationships indicated by the technical terms "center", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of description of the embodiments of this disclosure rather than indicating or implying that the means or components mentioned must have specific orientations or must be constructed or manipulated according to specific orientations, and therefore shall not be construed as any limitations on embodiments of this disclosure.

In the description of the embodiments of this disclosure, unless otherwise specified and defined explicitly, the terms "mount", "connect", "join", and "fasten" should be understood in their general senses. For example, they may refer to a fixed connection, a detachable connection, or an integral connection, may refer to a mechanical connection or an electrical connection, and may refer to a direct connection, an indirect connection via an intermediate medium, an internal communication between two elements, or an interaction between two elements. Persons of ordinary skill in the art can understand specific meanings of these terms in the embodiments of this disclosure as appropriate to specific situations.

In the embodiments of this disclosure, the battery apparatus refers to a single physical module that includes one or more battery cells for providing a higher voltage and capacity. The battery cell is a smallest unit constituting a battery. The battery cell includes an electrode assembly in which electrochemical reactions can occur. The battery cell may be a secondary battery, where the secondary battery refers to a battery cell that can continue to be used by activating the active material through charging after the battery cells are discharged.

The battery cell may include a lithium-ion battery, a sodium-ion battery, a sodium-lithium-ion battery, a lithium metal battery, a sodium metal battery, a lithium-sulfur battery, a magnesium-ion battery, a nickel-metal hydride battery, a nickel-cadmium battery, a lead-acid battery, and the like. This is not limited in this embodiment of this disclosure.

In some embodiments, the battery apparatus may include a box and a battery cell, where the battery cell is accommodated in the box. The box can be made of metal, non-metal, or composite materials. Multiple battery cells may be arranged along at least one of a length direction and a width direction of the box. At least one row or one column of battery cells may be provided according to actual requirements. According to requirements, one or more layers of battery cells may also be arranged in a height direction of the battery apparatus.

The battery cells are electrically connected, such as in series, in parallel, or in series-parallel to achieve the required electrical performance parameters of the battery apparatus. Being connected in series-parallel means a combination of series and parallel connections of the plurality of battery cells. Adjacent battery cells may be electrically connected by bus bars. A plurality of battery cells are arranged in rows, and one or more rows of battery cells may be provided in the box as needed. The box can be made of metal, non-metal, or composite materials.

In some embodiments, the battery apparatus may include a box and a battery module, where the box is configured to provide an accommodating space for the battery module, and the battery module is installed in the box. The battery module may be first formed by connecting the plurality of battery cells in series, parallel, or series-parallel, and then a plurality of battery modules are connected in series, parallel, or series-parallel to form an entirety which is accommodated in the box.

In some embodiments, the battery cell includes an electrode assembly, a housing, and an end cover. The housing has an accommodating cavity for accommodating the electrode assembly and an opening end communicating with the accommodating cavity. The end cover covers the opening end.

The electrode assembly may include a first electrode plate and a second electrode plate with opposite polarities and further includes a separator disposed between the first electrode plate and the second electrode plate. In some embodiments, the first electrode plate is a positive electrode plate, and the second electrode plate is a negative electrode plate. In some embodiments, the first electrode plate is a negative electrode plate, and the second electrode plate is a positive electrode plate. During charging and discharging of the battery cell, active ions (for example, lithium ions) migrate between the positive electrode plate and the negative electrode plate. The separator is sandwiched between the positive electrode plate and the negative electrode plate to prevent short circuits between the positive and negative electrodes and allow active ions to pass through.

In some embodiments, the positive electrode plate may include a positive electrode current collector substrate and a positive electrode active material layer disposed on at least one surface of the positive electrode current collector substrate.

For example, the positive electrode current collector substrate includes two back-to-back surfaces in a thickness direction of the positive electrode current collector substrate, and the positive electrode active material layer is disposed on either or both of the two back-to-back surfaces of the positive electrode current collector substrate.

For example, the positive electrode current collector substrate may be a metal foil current collector or a composite current collector. For example, as the metal foil, the positive electrode current collector substrate may use silver surface-treated aluminum or stainless steel, stainless steel, copper, aluminum, nickel, baked carbon, carbon, nickel, or titanium. The composite current collector may include a polymer material matrix and a metal layer. The composite current collector may be formed by disposing a metal material (aluminum, aluminum alloy, nickel, nickel alloy, titanium, titanium alloy, silver, silver alloy, or the like) on a polymer material matrix (for example, a matrix of polypropylene, polyethylene terephthalate, polybutylene terephthalate, polystyrene, or polyethylene).

For example, the positive electrode active material layer may include at least one of the following materials: lithium-containing phosphate, lithium transition metal oxide, and respective modified compounds thereof. However, this disclosure is not limited to such materials, and may alternatively use other conventional well-known materials that can be used as positive electrode active material layers for batteries. One type of these positive electrode active material layers may be used alone, or two or more of them may be used in combination. An example of the lithium-containing phosphate may include but is not limited to at least one of lithium iron phosphate (for example, $LiFePO_4$ (or LFP for short)), composite materials of lithium iron phosphate and carbon, lithium manganese phosphate (for example, $LiMnPO_4$), composite materials of lithium manganese phosphate and carbon, lithium manganese iron phosphate, and composite materials of lithium manganese iron phosphate and carbon. Examples of the lithium transition metal oxide may include but are not limited to at least one of lithium cobalt oxide (for example, $LiCoO_2$), lithium nickel oxide (for example, $LiNiO_2$), lithium manganese oxide (for example, $LiMnO_2$ and $LiMn_2O_4$), lithium nickel cobalt oxide, lithium manganese cobalt oxide, lithium nickel manganese oxide, lithium nickel cobalt manganese oxide (for example, $LiNi_{1/3}Co_{1/3}Mn_{1/3}O_2$ ($NCM_{333}$ for short), $LiNi_{0.5}Co_{0.2}Mn_{0.3}O_2$ ($NCM_{523}$ for short), $LiNi_{0.5}Co_{0.25}Mn_{0.25}O_2$ ($NCM_{211}$ for short), $LiNi_{0.6}Co_{0.2}Mn_{0.2}O_2$ ($NCM_{622}$ for short), and $LiNi_{0.8}Co_{0.1}Mn_{0.1}O_2$ ($NCM_{811}$ for short)), lithium nickel cobalt aluminum oxide (for example, $LiNi_{0.85}Co_{0.15}Al_{0.05}O_2$), and modified compounds thereof.

In some embodiments, the negative electrode plate may include a negative electrode current collector substrate.

For example, the negative electrode current collector substrate may be a metal foil, foam metal, or a composite current collector. For example, as the metal foil, the negative electrode current collector may use silver surface-treated aluminum or stainless steel, stainless steel, copper, aluminum, nickel, baked carbon, carbon, nickel, or titanium. The foam metal may be foam nickel, foam copper, foam aluminum, foam alloy, foam carbon, or the like. The composite current collector may include a polymer material matrix and a metal layer. The composite current collector may be formed by disposing a metal material (copper, copper alloy, nickel, nickel alloy, titanium, titanium alloy, silver, silver alloy, or the like) on a polymer material matrix (for example, a matrix of polypropylene, polyethylene terephthalate, polybutylene terephthalate, polystyrene, or polyethylene).

In some embodiments, the negative electrode plate may include a negative electrode current collector substrate and a negative electrode active material layer disposed on at least one surface of the negative electrode current collector substrate.

For example, the negative electrode current collector substrate has two back-to-back surfaces in its thickness direction, and the negative electrode active material layer is disposed on either or both of the two back-to-back surfaces of the negative electrode current collector substrate.

For example, the negative electrode active material layer may be a negative electrode active material layer well known in the art and used for the battery cell. For example, the negative electrode active material layer may include at least one of the following materials: artificial graphite, natural graphite, soft carbon, hard carbon, a silicon-based material, a tin-based material, lithium titanate, and the like. The silicon-based material may be selected from at least one of elemental silicon, a silicon-oxygen compound, a silicon-carbon composite, a silicon-nitrogen composite, and a silicon alloy. The tin-based material may be selected from at least one of elemental tin, a tin-oxygen compound, or a tin alloy. However, this disclosure is not limited to such materials, and may alternatively use other conventional materials that can be used for the negative electrode active material layer of the battery. One type of these negative electrode active material layers may be used alone, or two or more of them may be used in combination.

In some embodiments, the positive electrode current collector substrate may be made of material aluminum, and the negative electrode current collector substrate may be made of material copper.

In some embodiments, the separator is an isolating film. The isolating film is not limited to any particular type in this disclosure, and may be any well-known porous separator with good chemical stability and mechanical stability.

For example, major materials of the isolating film may be selected from at least one of glass fiber, non-woven fabric, polyethylene, polypropylene, polyvinylidene fluoride, or ceramics. The isolating film may be a single-layer film or a multi-layer composite film and is not particularly limited. When the isolating film is a multi-layer composite film, all layers may be made of same or different materials, which is not particularly limited. The separator may be a separate component located between the positive electrode plate and the negative electrode plate, or it may be attached to a surface of the positive electrode plate and/or the negative electrode plate while being located between the positive electrode plate and the negative electrode plate.

In some embodiments, the separator is a solid electrolyte. The solid electrolyte is arranged between the positive electrode plate and the negative electrode plate, functioning to transmit ions and isolate the positive and negative electrodes.

In some embodiments, the battery cell further includes an electrolyte, where the electrolyte functions to conduct ions between the positive and negative electrodes. The electrolyte is not specifically limited to any particular type in this disclosure, and may be selected depending on needs. The electrolyte may be in a liquid state, a gel state, or a solid state.

For example, the liquid electrolyte includes an electrolytic salt and a solvent.

In some embodiments, the electrolytic salt may be at least one selected from lithium hexafluorophosphate, lithium tetrafluoroborate, lithium perchlorate, lithium hexafluoroborate, lithium bis(fluorosulfonyl)imide, lithium bis-trifluoromethanesulfonimide, lithium trifluoromethanesulfonate, lithium difluorophosphate, lithium difluoroxalate borate, lithium bisoxalatoborate, lithium difluorobisoxalate phosphate, and lithium tetrafluoro oxalate phosphate.

In some embodiments, the solvent may be at least one selected from ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, methyl sulfonyl methane, methyl ethyl sulfone, and diethyl sulfone. The solvent may also be an ether solvent. The ether solvent may include one or more of ethylene glycol dimethyl ether, ethylene glycol diethyl ether, diethylene glycol dimethyl ether, triethylene glycol dimethyl ether, tetraethylene glycol dimethyl ether, 1,3-dioxolane, tetrahydrofuran, methyltetrahydrofuran, diphenyl ether, and crown ether.

For example, a gel electrolyte includes a polymer as an electrolyte skeleton network, combined with ionic liquid-lithium salt.

For example, a solid electrolyte includes a polymer solid electrolyte, an inorganic solid electrolyte, and a composite solid electrolyte.

For example, a polymer solid electrolyte may be polyether (polyethylene oxide), polysiloxane, polycarbonate, polyacrylonitrile, polyvinylidene fluoride, polymethyl methacrylate, single ion polymer, polymer ionic liquid-lithium salt, cellulose, and the like.

For example, an inorganic solid electrolyte may be one or more of an oxide solid electrolyte (crystalline perovskite, NASICON, garnet, and amorphous LiPON film), a sulfide solid electrolyte (crystalline lithium superionic conductor (lithium germanium phosphorus sulfur, and argyrodite), amorphous sulfide), a halide solid electrolyte, a nitride solid electrolyte, and a hydride solid electrolyte.

For example, a composite solid electrolyte is formed by adding an inorganic solid electrolyte filler to a polymer solid electrolyte.

In some embodiments, the electrode assembly includes a main body. The main body may be a wound structure main body formed by winding a positive electrode plate, a negative electrode plate, and a separator, or a laminated structure main body formed by overlapping the positive electrode plate, the negative electrode plate, and the separator. The positive electrode plate and the negative electrode plate may each be arranged in one or more. For example, multiple positive electrode plates and multiple negative electrode plates are alternately arranged in a thickness direction of the plates.

In some embodiments, a shape of the main body may be cylindrical, flat, multi-prismatic, and the like. An end of the main body may be provided with a first tab and a second tab. The first tab may be formed by cutting or shearing the current collector substrate of the first electrode plate, or it may be connected to a side of the current collector substrate of the first electrode plate by welding. The second tab may be formed by cutting or shearing the current collector substrate of the second electrode plate, or it may be connected to a side of the current collector substrate of the second electrode plate by welding.

For an embodiment where the first electrode plate is a positive electrode plate and the second electrode plate is a negative electrode plate, the first electrode plate includes a positive electrode tab serving as the first tab, and the second electrode plate includes a negative electrode tab serving as the second tab. For an embodiment where the first electrode plate is a negative electrode plate and the second electrode plate is a positive electrode plate, the first electrode plate includes a negative electrode tab serving as the first tab, and the second electrode plate includes a positive electrode tab serving as the second tab.

The housing is configured to encapsulate the electrode assembly, the electrolyte, and the like. The housing may be a steel housing, an aluminum housing, a composite metal housing (such as a copper-aluminum composite housing), and the like.

For example, the battery cell may be a cylindrical battery cell, a prismatic battery cell, a pouch battery cell, or a battery cell of another shape. The prismatic battery cell includes a square battery cell, a blade battery cell, and a multi-prismatic battery, such as a hexagonal battery.

A pressure relief component may be provided on the end cover. The pressure relief component is an element or part that is actuated when internal pressure or temperature of the battery cell reaches a predetermined threshold, so as to release the internal pressure or temperature. Design of the threshold varies with different design requirements. The threshold may depend on the material used for one or more of a positive electrode plate, a negative electrode plate, an electrolyte, and an isolating film in the battery cell. The pressure relief component may be in a form of an explosion-proof valve, a gas valve, a pressure relief valve, a safety valve, or the like, and may specifically use a pressure sensitive or temperature sensitive element or structure. To be specific, when an internal pressure or temperature of the battery cell reaches a preset threshold, the pressure relief component performs an action or a weak structure provided in the pressure relief component is destroyed, thereby forming an opening or channel for discharge of the internal pressure or temperature.

When the electrode assembly undergoes thermal runaway or similar situations, the generated high-temperature and high-pressure gas will enter the pressure relief cavity, and the gas may still contain active materials. When the pressure in the pressure relief cavity exceeds the designed threshold, the pressure relief component 50 releases the internal pressure, discharging the emissions from the battery cell. The emissions from the battery cell mentioned herein include but are not limited to electrolyte, fragments of positive and negative electrode plates and the isolating film because of dissolution or breaking, high-temperature and high-pressure gases (for example, combustible gases including $CH_4$, CO, and the like) and flames produced by reactions, and the like.

In some related technologies, a charging station can convert electric energy from the power grid and charge the power battery of an electric vehicle. Considering that the temperatures of various charging piles and charging guns in a charging station will rise during operation, in order to improve is reliability and service life, a liquid cooling system capable of exchanging heat with a refrigeration system is provided to cool the charging piles and charging guns. In some related technologies, the liquid cooling system of the charging station can also be used to cool the power battery of an electric vehicle during the charging process.

Research has found that a thermal management system of related technologies mainly focus on the thermal management of charging piles in an ordinary charging station or the thermal management of charging piles and power batteries. For a charging station that contains battery apparatuses, there is still a lack of an effective thermal management solution for charging guns and battery apparatuses.

In view of this, an embodiment of this disclosure provides a charging system that can effectively meet the thermal management requirements of the charging connector and the battery apparatus while achieving the charging of the power battery of the vehicle.

According to an aspect of this disclosure, a charging system is provided for charging a power battery of a vehicle, including:

a battery apparatus configured to store energy and charge the power battery by releasing energy;

a charging connector configured to connect to the vehicle so as to charge the power battery via the charging connector; and a thermal management system, including a first heat exchange flow path, a second heat exchange flow path, and a first switching mechanism; where the first heat exchange flow path includes a first heat exchanger configured to exchange heat with the battery apparatus, the second heat exchange flow path includes a second heat exchanger configured to exchange heat with the charging connector, and the second heat exchange flow path is connected to the first heat exchange flow path via the first switching mechanism, so that through an operation of switching the first switching mechanism, the second heat exchange flow path and the first heat exchange flow path become communicated with each other via the first switching mechanism or a communication relationship between the second heat exchange flow path and the first heat exchange flow path via the first switching mechanism is disconnected.

In this embodiment, the charging system for charging a power battery of a vehicle has a charging connector and a battery apparatus, which can store energy through the battery apparatus when power demand or electricity price is low so that it is used for charging the power battery when power demand or electricity price is high, thereby reducing the operating cost of the charging system and reducing the burden on the power grid. For this kind of charging system, the first heat exchange flow path and the second heat exchange flow path are provided to perform heat exchange with the battery apparatus and the charging connector respectively through the first heat exchanger and the second heat exchanger, and an operation of switching the first switching mechanism is performed to connect or disconnect a communication relationship between the second heat exchange flow path with the first heat exchange flow path via the first switching mechanism, so as to form different heat exchange loops according to the needs, thereby effectively meeting the thermal management requirements of the charging connector and the battery apparatus.

Figure 2:
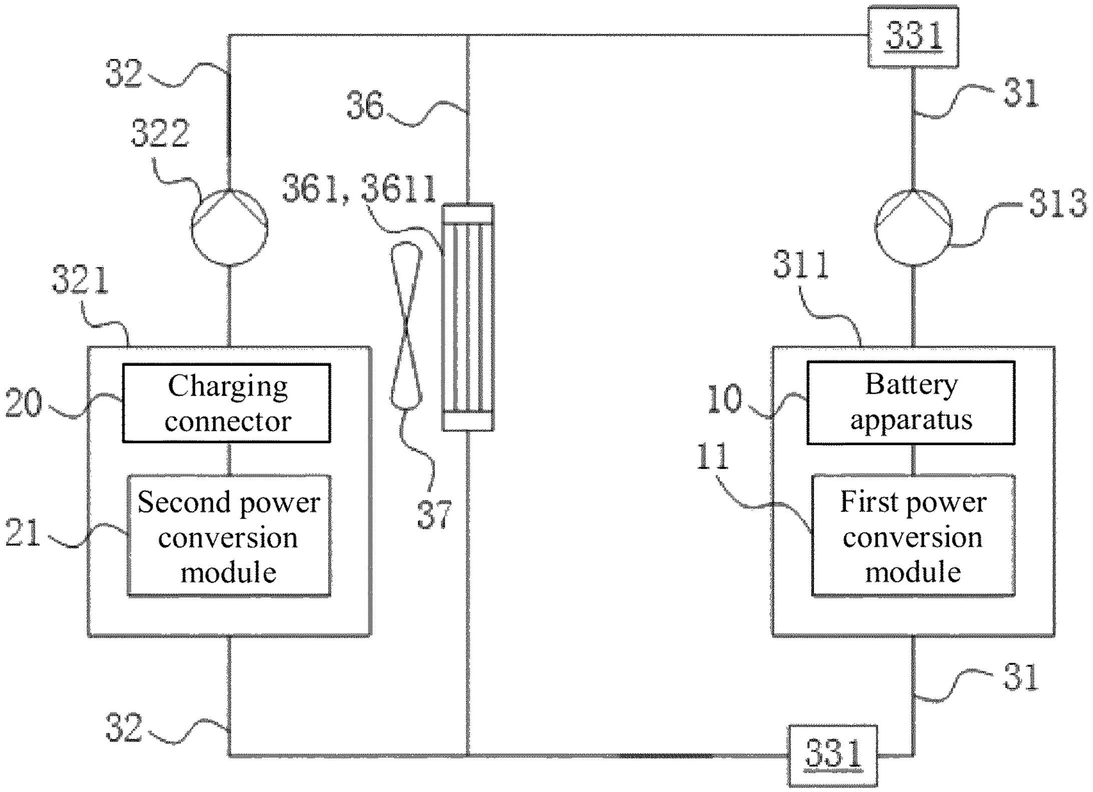
FIG. 2 is a schematic structural diagram of a thermal management system according to a first embodiment of a charging system of this disclosure.

FIG. 1 is a schematic structural diagram according to some embodiments of a charging system of this disclosure. FIG. 2 is a schematic structural diagram of a thermal management system according to a first embodiment of a charging system of this disclosure. Referring to FIG. 1 and FIG. 2, an embodiment of this disclosure provides a charging system for charging a power battery of a vehicle. The charging system includes: a battery apparatus 10, a charging connector 20, and a thermal management system 30. The battery apparatus 10 is configured to store energy and charge the power battery by releasing energy. The charging connector 20 is configured to connect to the vehicle so as to charge the power battery via the charging connector 20. The thermal management system 30 includes a first heat exchange flow path 31, a second heat exchange flow path 32, and a first switching mechanism 331. The first heat exchange flow path 31 includes a first heat exchanger 311 configured to exchange heat with the battery apparatus 10, the second heat exchange flow path 32 includes a second heat exchanger 321 configured to exchange heat with the charging connector 20, and the second heat exchange flow path 32 is connected to the first heat exchange flow path 31 via the first switching mechanism 331, so that through an operation of switching the first switching mechanism 331, the second heat exchange flow path 32 and the first heat exchange flow path 31 become communicated with each other via the first switching mechanism 331 or a communication relationship between the second heat exchange flow path 32 and the first heat exchange flow path 31 via the first switching mechanism 331 is disconnected.

The charging system can implement charging of the power battery of the vehicle. Here, the vehicle may include a car, an electric bicycle, a ship, an aircraft, and the like, where the car may be a fossil fuel car, a natural-gas car, or a new energy car. The new energy car may be a pure electric car, a hybrid electric car, and the like. Taking a car as an example, the power battery may be arranged at the bottom, rear, front, or other positions of the car, and is used to provide the electric power required to drive the car. The power battery may also be used to supply electric power to other components of the car (such as air conditioning, lighting, and entertainment devices).

The charging system includes a battery apparatus 10 and a charging connector 20, which can realize charging of the power battery through the charging connector 20, and can also charge the battery apparatus 10. The charging system can take the form of a charging pile that integrates charging and storage. In some embodiments, the charging system may include one or more battery apparatuses 10 and may also include one or more charging connectors 20.

The battery apparatus 10 in the charging system can store and release electric energy. It can obtain electric energy from the power grid, generator, photovoltaic power generation equipment, wind power generation equipment, and the like, and store it. When a vehicle needs to have its power battery charged in the charging system, the battery apparatus 10 can be one of the sources providing electric power. The battery apparatus 10 can not only be used for charging the power battery but also for supplying power to another load. For the specific structure of the battery apparatus 10, refer to the previous description of the battery apparatus and the battery cell. Details are not described herein again.

The charging connector 20 can realize connection with the power interface of the vehicle when the power battery needs charging and disconnect from the power interface of the vehicle when charging is completed. The charging connector 20 may also be called a charging gun, and its structure can match the power interface of the vehicle to ensure stable and reliable charging. The charging connector 20 can charge the power battery of the vehicle with electric power from any one or a combination of the power grid, a power generation source, and the battery apparatus 10.

The thermal management system 30 can be used for thermal management of the battery apparatus 10 and the charging connector 20, for example, the implementation of the cooling or heating of the battery apparatus 10 and the cooling of the charging connector 20. The thermal management system 30 can be connected to the battery apparatus 10 and the charging connector 20 to achieve thermal management of the battery apparatus 10 and the charging connector 20.

The heat exchange medium running in the first heat exchange flow path 31 and the second heat exchange flow path 32 may be liquid, such as water, aqueous coolant, or non-aqueous coolant, but not limited to liquid. It may also be gas, solid-liquid mixture, gas-liquid mixture, and the like.

The first heat exchanger 311 is arranged in the first heat exchange flow path 31, and the heat exchange medium exchanges heat with the battery apparatus 10 in the first heat exchanger 311. The first heat exchanger 311 may transfer heat with the battery apparatus 10 through, but not limited to, thermal conduction. For example, the first heat exchanger 311 may include a cooling plate in contact with the battery apparatus 10. The cooling plate may be independent of the battery apparatus 10 or may be part of the battery apparatus 10. For example, it may be arranged at the bottom of the battery box or between individual battery cells in the battery module.

The second heat exchanger 321 is arranged in the second heat exchange flow path 32, and the heat exchange medium exchanges heat with the charging connector 20 in the second heat exchanger 321. The second heat exchanger 321 may transfer heat with the charging connector 20 through, but not limited to, thermal conduction. For example, the second heat exchanger 321 may include a cooling plate in contact with the charging connector 20. The cooling plate may be independent of the charging connector 20, or it may be part of the charging connector 20.

The second heat exchange flow path 32 is connected to the first heat exchange flow path 31 via the first switching mechanism 331. Through an operation of switching the first switching mechanism 331, the second heat exchange flow path 32 and the first heat exchange flow path 31 become communicated with each other via the first switching mechanism 331 or a communication relationship between the second heat exchange flow path 32 and the first heat exchange flow path 31 via the first switching mechanism 331 is disconnected.

The first switching mechanism 331 may include a valve that can control the on or off state and may also include a connection flow path connecting the second heat exchange flow path 32 and the first heat exchange flow path 31. The valve may be arranged at either a position connecting the connection flow path to the second heat exchange flow path 32 or a position connecting the connection flow path to the first heat exchange flow path 31, or it can be arranged inside the connection flow path. In FIG. 2, one end of the second heat exchange flow path 32 is connected to one end of the first heat exchange flow path 31 via the first switching mechanism 331; and another end of the second heat exchange flow path 32 is connected to another end of the first heat exchange flow path 31 via the first switching mechanism 331. In other embodiments, it may alternatively be that only one end of the second heat exchange flow path 32 is connected to one end of the first heat exchange flow path 31 via the first switching mechanism 331.

In this embodiment, the charging system for charging a power battery of a vehicle has a charging connector 20 and a battery apparatus 10, which can store energy through the battery apparatus 10 when power demand or electricity price is low so that it is used for charging the power battery when power demand or electricity price is high, thereby reducing the operating cost of the charging system and reducing the burden on the power grid. For this kind of charging system, the first heat exchange flow path 31 and the second heat exchange flow path 32 are provided to perform heat exchange with the battery apparatus 10 and the charging connector 20 respectively through the first heat exchanger 311 and the second heat exchanger 321, and an operation of switching the first switching mechanism 331 is performed to connect or disconnect a communication relationship between the second heat exchange flow path 32 with the first heat exchange flow path 31 via the first switching mechanism 331, so as to form different heat exchange loops according to the needs, thereby effectively meeting the thermal management requirements of the charging connector 20 and the battery apparatus 10.

Referring to FIG. 2, in some embodiments, the charging system further includes: a first power conversion module 11 and/or a second power conversion module 21. The first power conversion module 11 is connected to the battery apparatus 10 and exchanges heat with the first heat exchanger 311. The second power conversion module 21 is connected to the charging connector 20 and exchanges heat with the second heat exchanger 321.

The first power conversion module 11 may include an AC/DC converter, where the AD/DC converter can convert AC power from the power grid or a power generation source into DC power to charge the battery apparatus 10 to allow the battery apparatus 10 to store electrical energy. The second power conversion module 21 may include a DC/DC converter, where the DC/DC converter can convert DC power of one voltage into DC power of another voltage to match the charging interface of the vehicle being charged, so as to charge the power battery via the charging connector 20.

In this embodiment, either the first power conversion module 11 or the second power conversion module 21 generates heat during operation. Through heat exchange between the first heat exchanger 311 and the first power conversion module 11, as well as heat exchange between the second heat exchanger 321 and the second power conversion module 21, the modules can achieve longer operating times and lifespans.

Figure 3A:
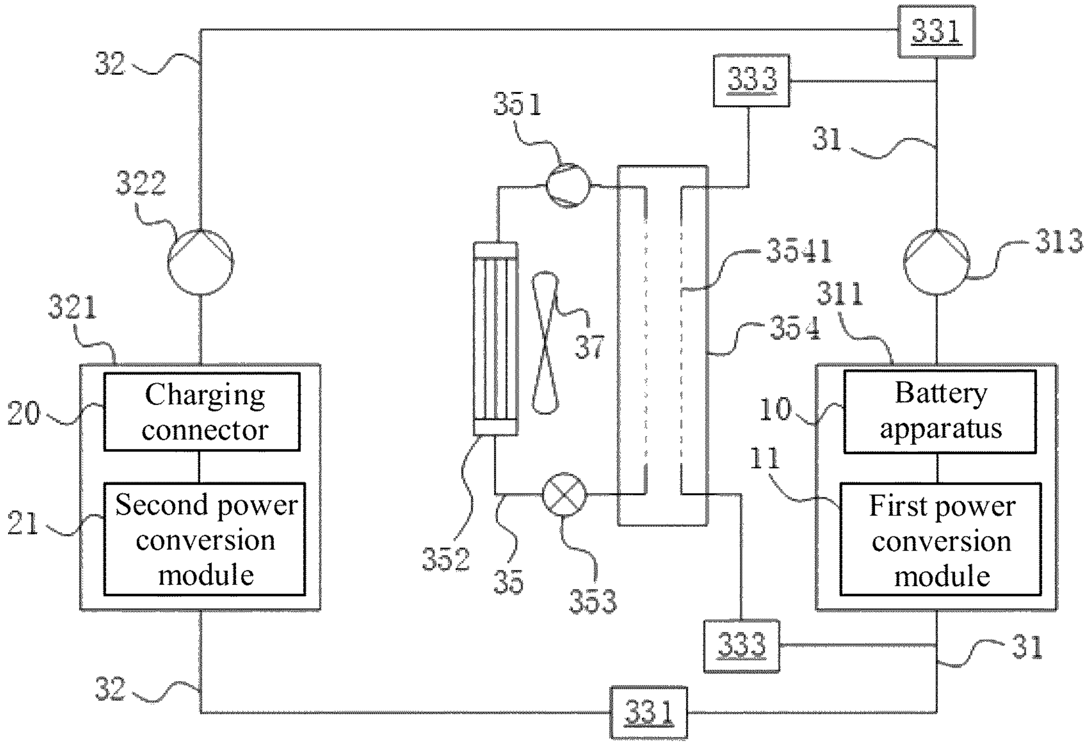
FIG. 3A is a schematic structural diagram of a thermal management system according to a second embodiment of a charging system of this disclosure.
Figure 3B:
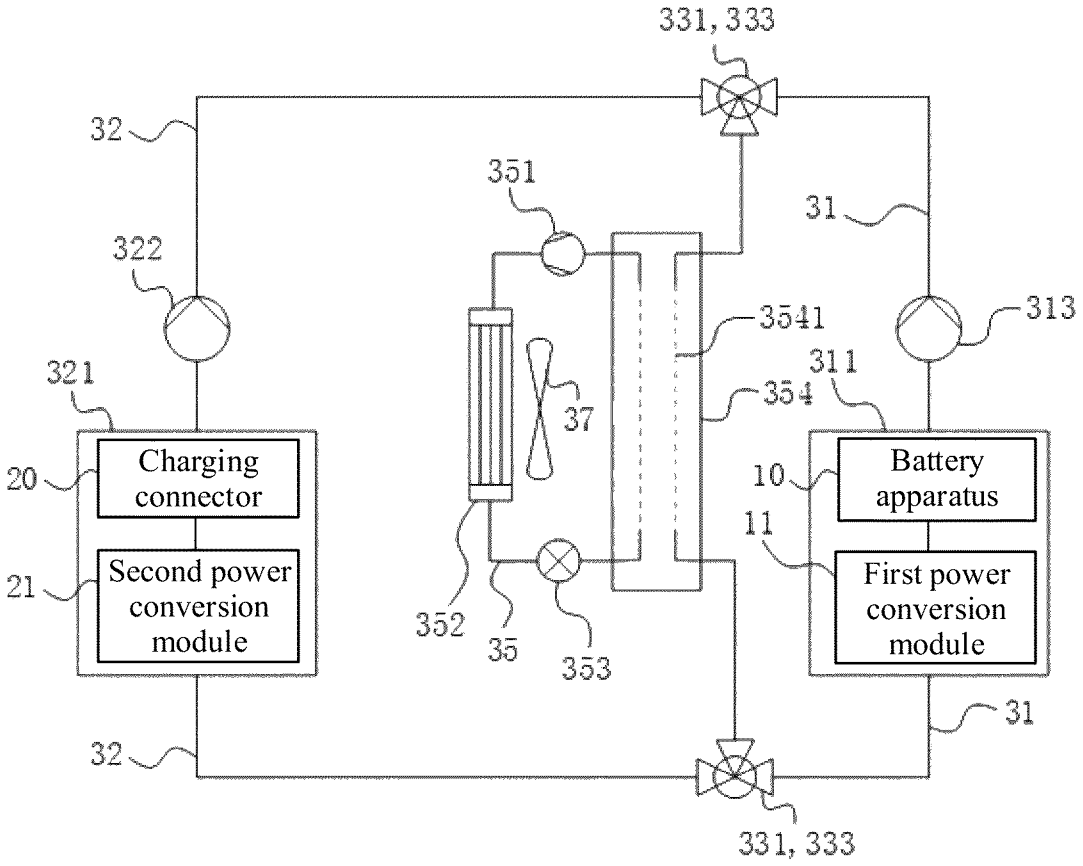
FIG. 3B is a schematic structural diagram of using a three-way liquid valve to implement the switching mechanism in the embodiment shown in FIG. 3A.

FIG. 3A is a schematic structural diagram of a thermal management system according to a second embodiment of a charging system of this disclosure. FIG. 3B is a schematic structural diagram of using a three-way liquid valve to implement the switching mechanism in the embodiment shown in FIG. 3A. Referring to FIG. 3A, in some embodiments, thermal management system 30 further includes a compression refrigeration circulation loop 35 and a third switching mechanism 333, where the compression refrigeration circulation loop 35 includes an evaporator 354, the evaporator 354 further includes an internal heat exchange flow path 3541, and the internal heat exchange flow path 3541 is connected to the first heat exchange flow path 31 via the third switching mechanism 333 so that through an operation of switching the third switching mechanism 333, the internal heat exchange flow path 3541 and the first heat exchange flow path 31 become communicated with each other via the third switching mechanism 333 or a communication relationship between the internal heat exchange flow path 3541 and the first heat exchange flow path 31 via the third switching mechanism 333 is disconnected.

The compression refrigeration circulation loop 35 can realize the circulation of refrigerant liquid, achieving heat transfer through the condensation and evaporation of the refrigerant liquid. The refrigerant may include but is not limited to water, ammonia, carbon dioxide, halogenated hydrocarbon refrigerants, and the like. The refrigerant in the compression refrigeration circulation loop 35 runs independently of the heat exchange medium in the first heat exchange flow path 31 and the internal heat exchange flow path 3541. The refrigerant liquid achieves heat transfer through heat exchange with the heat exchange medium.

The internal heat exchange flow path 3541 is connected to the first heat exchange flow path 31 via the third switching mechanism 333. When the third switching mechanism 333 is switched to a communicated state, the heat exchange medium in the first heat exchange flow path 31 can enter the internal heat exchange flow path 3541 to achieve heat exchange with the refrigerant running in the evaporator 354 within the compression refrigeration circulation loop 35. This allows the first heat exchange flow path 31 to receive cooling capacity from the compression refrigeration circulation loop 35, thereby cooling the flowing heat exchange medium. In FIG. 3A, the internal heat exchange flow path 3541 of the evaporator 354 and the portion of the compression refrigeration circulation loop 35 passing through the evaporator 354 are shown by dashed lines drawn in the evaporator 354. The evaporator 354 may be a plate-type evaporator or another form of evaporator, such as a shell-and-tube evaporator, and the like.

In FIG. 3A, the compression refrigeration circulation loop 35 may also include a compressor 351, a condenser 352, and a throttling apparatus 353. The compressor 351 can compress the low-temperature low-pressure gaseous refrigerant into a high-temperature high-pressure gaseous refrigerant. The condenser 352 can cool the high-temperature high-pressure gaseous refrigerant output by the compressor 351 through heat release, converting it at least partially into a liquid state. The throttling apparatus 353 may include a capillary tube, a thermal expansion valve, or an electronic expansion valve, which can lower the temperature and pressure of the refrigerant output by the condenser 352 through throttling. The evaporator 354 can raise the temperature of the refrigerant passing through the throttling apparatus 353 through heat absorption, causing it to at least partially convert into a gaseous state. The compression refrigeration circulation loop 35 may also include another component, such as a gas-liquid separator that performs gas-liquid separation on the refrigerant output by the evaporator 354 and an oil separator that performs oil-gas separation on the refrigerant discharged by the compressor 351. Details are not described herein again.

In this embodiment, through an operation of switching the third switching mechanism 333, the internal heat exchange flow path 3541 and the first heat exchange flow path 31 become communicated with each other via the third switching mechanism 333, or the communication relationship between the internal heat exchange flow path 3541 and the first heat exchange flow path 31 via the third switching mechanism 333 is disconnected, thereby utilizing the compression refrigeration circulation loop 35 to improve the thermal management efficiency achieved by the first heat exchange flow path 31. In addition, through an operation of switching the third switching mechanism 333, different heat exchange medium circulation loops can be formed, thereby increasing the flexibility of configuration for different thermal management requirements.

Referring to FIG. 3A, in some embodiments, the first heat exchange flow path 31 is configured as, when the third switching mechanism 333 is switched to a communicated state, at least part of the first heat exchange flow path 31 forms a heat exchange loop with the internal heat exchange flow path 3541.

In this embodiment, through an operation of switching the third switching mechanism 333, the internal heat exchange flow path 3541 and the first heat exchange flow path 31 become communicated with each other via the third switching mechanism 333, which allows at least part of the first heat exchange flow path 31 forms a heat exchange medium circulation loop with the internal heat exchange flow path 3541. In addition, when the compression refrigeration circulation loop 35 is activated, the cooling capacity generated by the compression refrigeration circulation loop 35 is provided to the first heat exchange flow path 31 through the heat exchange between the refrigerant circulating in the compression refrigeration circulation loop 35 and the heat exchange medium flowing through the internal heat exchange flow path 3541. Since the compression refrigeration circulation loop 35 can achieve high cooling efficiency, the cooling capacity transferred from the compression refrigeration circulation loop 35 to the first heat exchange flow path 31 can effectively reduce the temperature of the heat exchange medium flowing in the first heat exchange flow path 31, thereby improving the cooling capacity of the loop where the first heat exchange flow path 31 is located, which is conducive to enhancing the thermal management efficiency achieved by the first heat exchange flow path 31.

Referring to FIG. 3A and FIG. 3B, in some embodiments, the third switching mechanism 333 and the first switching mechanism 331, which are communicated with each other, are each implemented independently by a switching valve, or jointly implemented by a three-way liquid valve.

In FIG. 3A and FIG. 3B, the third switching mechanism 333 may include a valve that can control the on or off state and may also include a connection flow path connecting the internal heat exchange flow path 3541 and the first heat exchange flow path 31. The valve may be arranged at either a position connecting the connection flow path to the internal heat exchange flow path 3541 or a position connecting the connection flow path to the first heat exchange flow path 31, or it can be arranged inside the connection flow path. The third switching mechanism 333 and the first switching mechanism 331, which are communicated with each other, can each be implemented independently through a switching valve or by be jointly implemented through a same valve.

Taking FIG. 3A as an example, each of two ends of the first heat exchange flow path 31 is connected to both the third switching mechanism 333 and the first switching mechanism 331, where the third switching mechanism 333 and the first switching mechanism 331 may both adopt switching valves controlled by electrical, hydraulic, or other means to achieve the on or off state of the paths where they are located. In some embodiments, the switching valve is not limited to achieving the on or off state of a flow path but can also adjust the flow rate and flow speed through its opening degree when the flow path is in a communicated state.

Taking FIG. 3B as an example, the third switching mechanism 333 and the first switching mechanism 331 may be jointly implemented by a three-way liquid valve. The three-way liquid valve in FIG. 3B has three interfaces, which are connected to the first heat exchange flow path 31, the internal heat exchange flow path 3541, and the second heat exchange flow path 32, respectively. Through operations of switching the three-way liquid valve, disconnection of any one of the three interfaces, communication between any two of the three interfaces, and communication among all three interfaces can be implemented.

In this embodiment, the third switching mechanism 333 and the first switching mechanism 331, which are communicated with each other, can each be implemented independently by a switching valve, which can improve the control independence of each switching mechanism and facilitate maintenance; alternatively, they can be jointly implemented by a three-way liquid valve, which is conducive to simplifying the pipeline layout to save space and cost and is beneficial to simplifying the control logic to enhance control reliability.

Figure 4A:
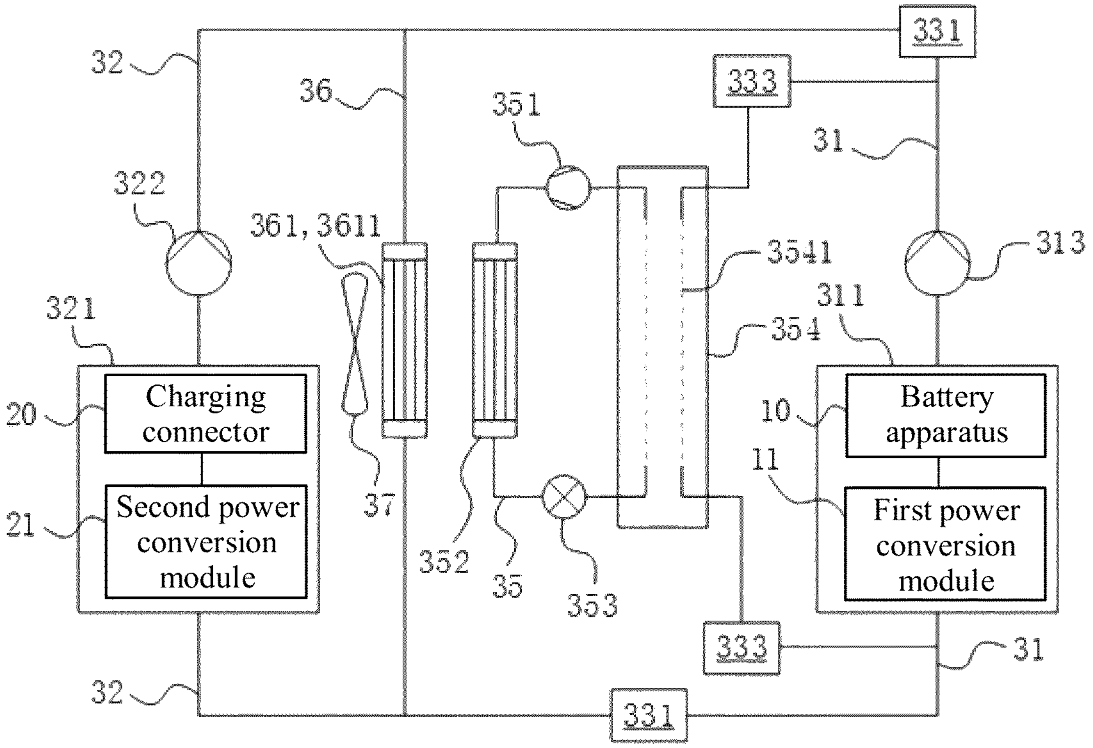
FIG. 4A is a schematic structural diagram of a thermal management system according to a third embodiment of a charging system of this disclosure.
Figure 4B:
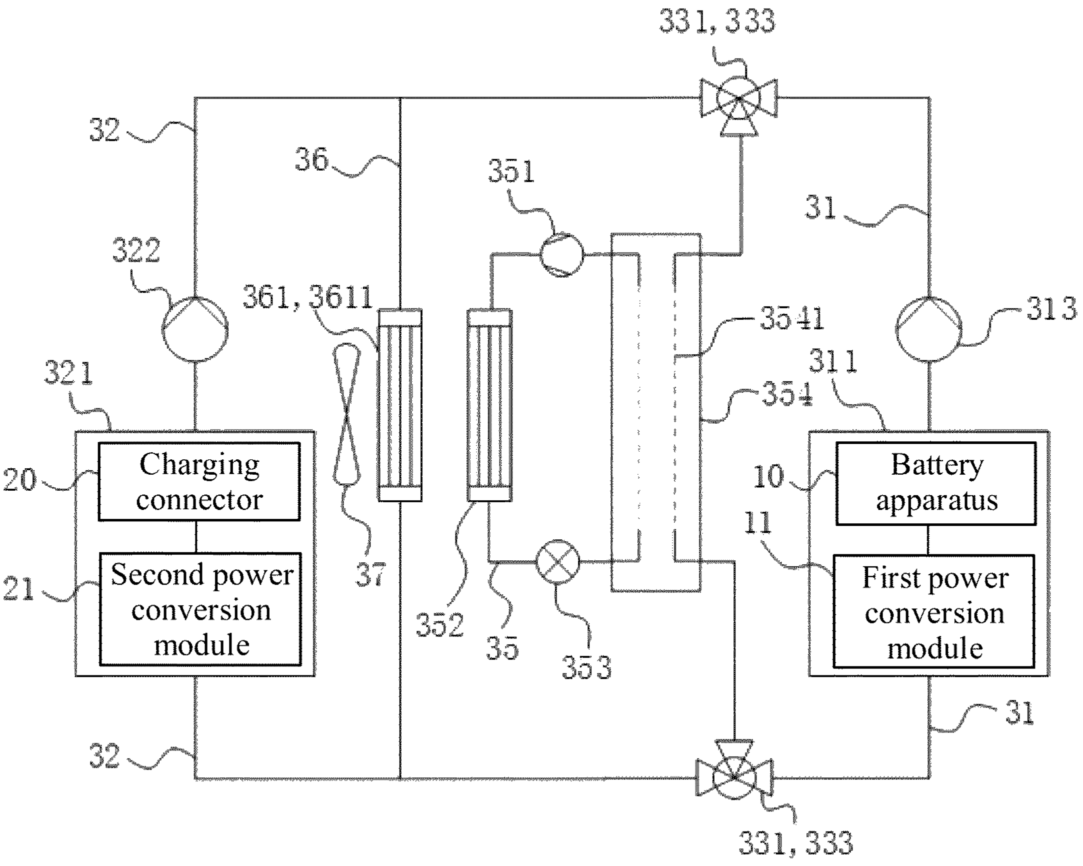
FIG. 4B is a schematic structural diagram of using a three-way liquid valve to implement the switching mechanism in the embodiment shown in FIG. 4A.

FIG. 4A is a schematic structural diagram of a thermal management system according to a third embodiment of a charging system of this disclosure. FIG. 4B is a schematic structural diagram of using a three-way liquid valve to implement the switching mechanism in the embodiment shown in FIG. 4A. Referring to FIG. 2 and FIG. 4A, in some embodiments, the thermal management system 30 further includes a third heat exchange flow path 36, where the third heat exchange flow path 36 further includes a third heat exchanger 361, the third heat exchange flow path 36 is connected in parallel with the second heat exchange flow path 32, and is connected to the first heat exchange flow path 31 via the first switching mechanism 331 so that through an operation of switching the first switching mechanism 331, the third heat exchange flow path 36 and the first heat exchange flow path 31 become communicated with each via the first switching mechanism 331 or a communication relationship between the third heat exchange flow path 36 and the first heat exchange flow path 31 via the first switching mechanism 331 is disconnected.

In FIG. 2 and FIG. 4A, two ends of the third heat exchange flow path 36 are connected to two ends of the second heat exchange flow path 32 respectively to form a parallel connection relationship. The third heat exchange flow path 36 and the second heat exchange flow path 32 are both connected to the first heat exchange flow path 31 via the first switching mechanism 331. Through the switching of the first switching mechanism 331 to its on or off state, different circulation loops can be implemented.

When the first switching mechanism 331 is switched to the off state, the communication relationship between either the second heat exchange flow path 32 or the third heat exchange flow path 36 and the first heat exchange flow path 31 via the first switching mechanism 331 is correspondingly disconnected. This can form a heat exchange medium circulation loop that is independent of the first heat exchange flow path 31 and contains the third heat exchange flow path 36 and the second heat exchange flow path 32, so as to meet the thermal management requirements of the charging connector through the third heat exchanger 361 without using the cooling capacity of the heat exchange medium in the first heat exchange flow path 31, thereby better adapting to the different thermal management requirements of the charging connector 20 and the battery apparatus 10.

In this embodiment, the third heat exchange flow path 36 containing the third heat exchanger 361 is connected in parallel with the second heat exchange flow path 32, and is connected to the first heat exchange flow path 31 via the first switching mechanism 331. Thus, through an operation of switching the first switching mechanism 331, different heat exchange medium circulation loops can be formed according to different thermal management requirements.

Referring to FIG. 2 and FIG. 4A, in some embodiments, the first heat exchange flow path 31 is configured as, when the first switching mechanism 331 is switched to a communicated state, at least part of the first heat exchange flow path 31 forms a heat exchange loop with the third heat exchange flow path 36.

When the first switching mechanism 331 is switched to a communicated state, the third heat exchange flow path 36 and the first heat exchange flow path 31 become communicated with each other via the first switching mechanism 331, so that the heat exchange medium in the first heat exchange flow path 31 can flow into the third heat exchange flow path 36 to exchange heat through the third heat exchanger 361. In this way, another circulation loop containing at least part of the first heat exchange flow path 31 and the third heat exchange flow path 36 (or further including the second heat exchange flow path 32) can be formed to meet the thermal management requirements of the battery apparatus 10 and the charging connector 20.

Referring to FIG. 2 and FIG. 4A, in some embodiments, the third heat exchanger 361 includes a natural cooling heat exchanger 3611.

The natural cooling heat exchanger 3611 can utilize the cooling capacity in the natural environment to exchange heat with the heat exchange medium passing through the natural cooling heat exchanger 3611, effectively saving energy consumption. As needed, a fan 37 may be arranged near the natural cooling heat exchanger 3611. The fan 37 guides the airflow in the environment to exchange heat with the natural cooling heat exchanger 3611, thereby improving the heat exchange efficiency.

The natural cooling heat exchanger 3611 may be a heat dissipation water tank, with a heat dissipation structure arranged outside to take away heat under the action of air, thereby cooling the heat exchange medium. Inside, a flow channel for the heat exchange medium to flow is arranged, so that heat exchange medium in the third heat exchange flow path 36 can flow smoothly through the natural cooling heat exchanger 3611.

In this embodiment, a natural cooling heat exchanger 3611 is provided in the third heat exchange flow path 36, where the natural cooling heat exchanger can participate in the natural heat exchange between the heat exchange medium in the thermal management system and the outside in some operating modes of the thermal management system 30, thus further reducing system energy consumption.

Referring to FIG. 4A, in some embodiments, the thermal management system 30 further includes a compression refrigeration circulation loop 35 and a third switching mechanism 333, the compression refrigeration circulation loop 35 includes a condenser 352 and an evaporator 354, the evaporator 354 further includes an internal heat exchange flow path 3541, and the internal heat exchange flow path 3541 is connected to the first heat exchange flow path 31 via the third switching mechanism 333; and the thermal management system 30 further includes a fan 37, and the fan 37 acts on the condenser 352 and the third heat exchanger 361.

The compression refrigeration circulation loop 35 can provide cooling capacity with higher efficiency to meet higher heat dissipation and cooling demands. The fan 37 may air-cool the condenser 352 to enhance the efficiency of the condenser 352. The fan 37 may include axial flow, centrifugal, mixed flow, and other types of fans. The fan 37 may also be configured to guide the airflow in the environment to exchange heat with the third heat exchanger 361, improving the heat exchange efficiency. Correspondingly, the number of fans 37 can be reduced, which is beneficial for reducing cost and energy consumption.

In this embodiment, the compression refrigeration circulation loop 35 and the third heat exchange flow path 36 can provide different levels of cooling capacities, consuming different amounts of energy. Under different working conditions, operations of switching the first switching mechanism 331 and the third switching mechanism 333 can be performed as needed to meet the requirements of improving thermal management efficiency or reducing energy consumption, thereby enhancing the adaptability of the thermal management system to the working conditions.

In FIG. 4A and FIG. 4B, the third switching mechanism 333 and the first switching mechanism 331, which are communicated with each other, can each be implemented independently through a switching valve or by be jointly implemented through a same valve.

Taking FIG. 4A as an example, each of two ends of the first heat exchange flow path 31 is connected to both the third switching mechanism 333 and the first switching mechanism 331, where the third switching mechanism 333 and the first switching mechanism 331 may both adopt switching valves controlled by electrical, hydraulic, or other means to achieve the on or off state of the paths where they are located. In some embodiments, the switching valve is not limited to achieving the on or off state of a flow path but can also adjust the flow rate and flow speed through its opening degree when the flow path is in a communicated state.

In FIG. 4B, the third switching mechanism 333 and the first switching mechanism 331 may be jointly implemented by a three-way liquid valve. The three-way liquid valve in FIG. 4B has three interfaces, which are connected to the first heat exchange flow path 31, the internal heat exchange flow path 3541, and the second heat exchange flow path 32, respectively. Through operations of switching the three-way liquid valve, disconnection of any one of the three interfaces, communication between any two of the three interfaces, and communication among all three interfaces can be implemented.

Figure 5A:
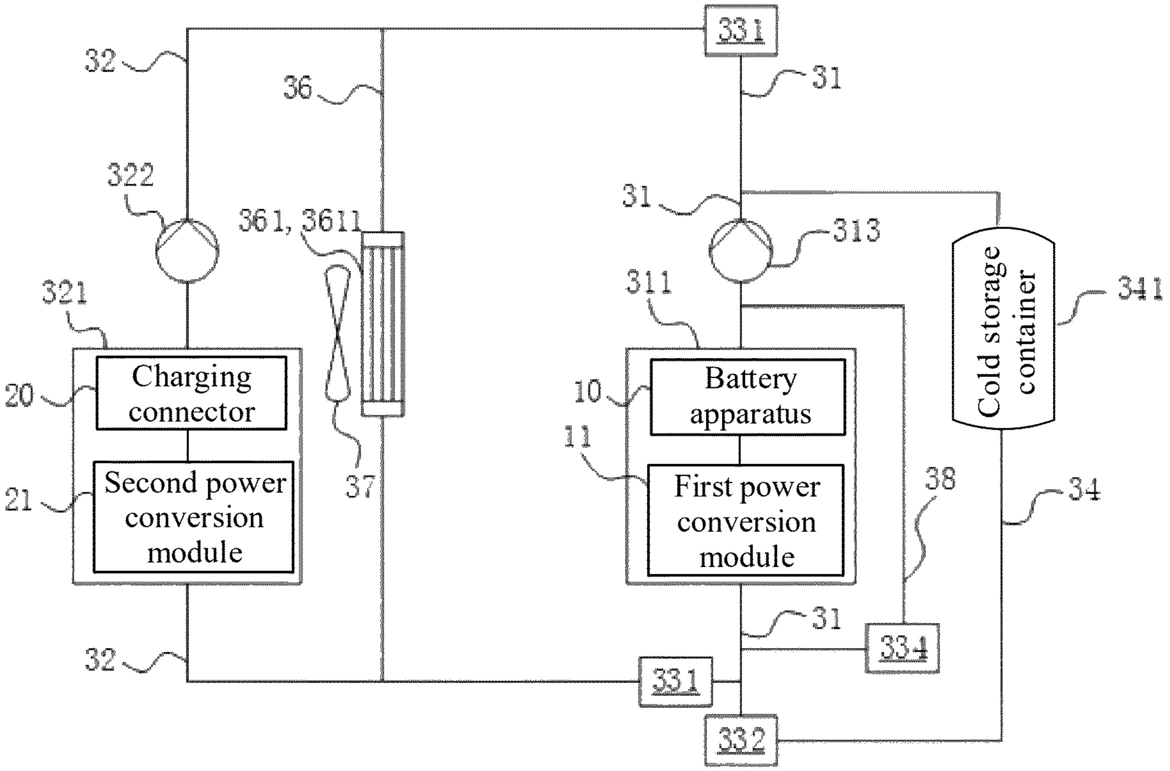
FIG. 5A is a schematic structural diagram of a thermal management system according to a fourth embodiment of a charging system of this disclosure.
Figure 5B:
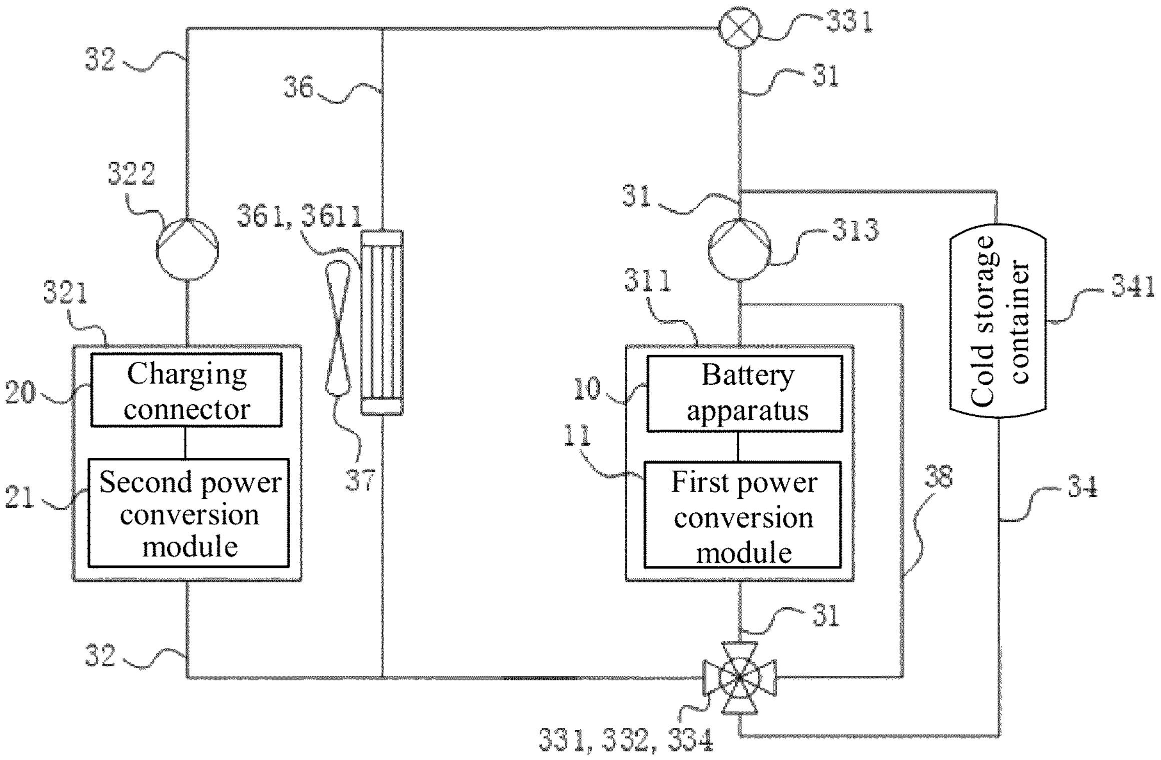
FIG. 5B is a schematic structural diagram of using a four-way liquid valve to implement the switching mechanism in the embodiment shown in FIG. 5A.
Figure 6A:
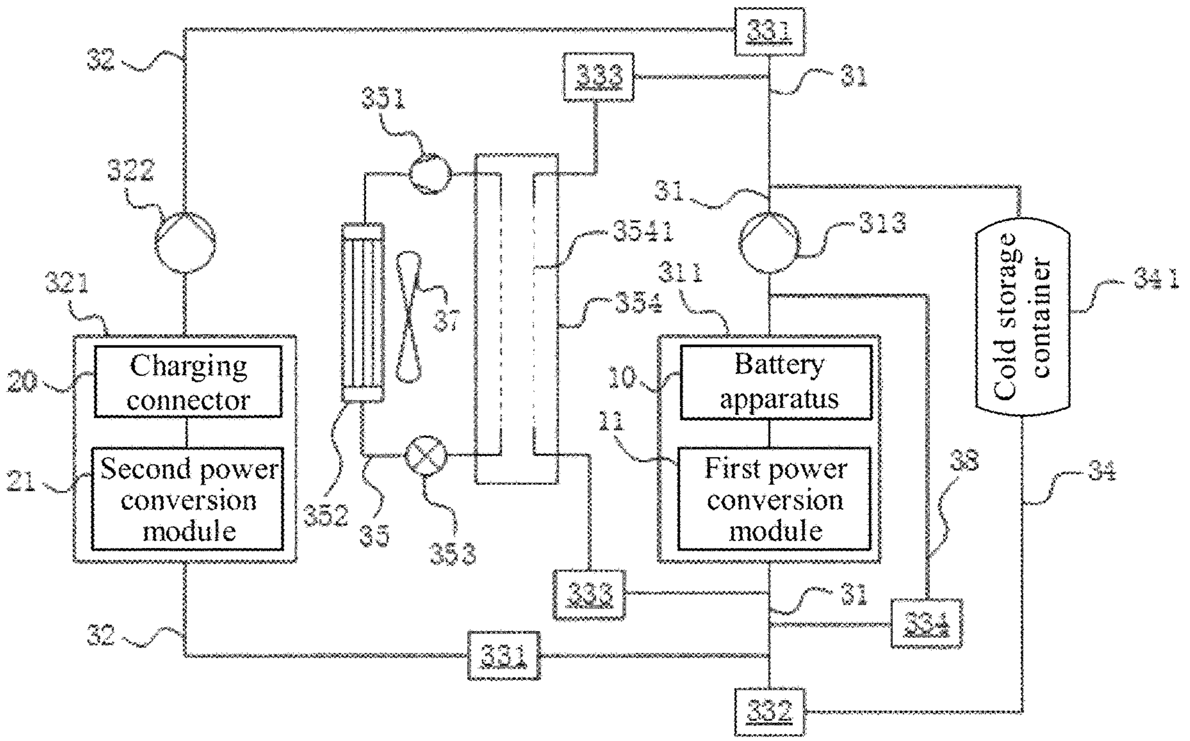
FIG. 6A is a schematic structural diagram of a thermal management system according to a fifth embodiment of a charging system of this disclosure.
Figure 6B:
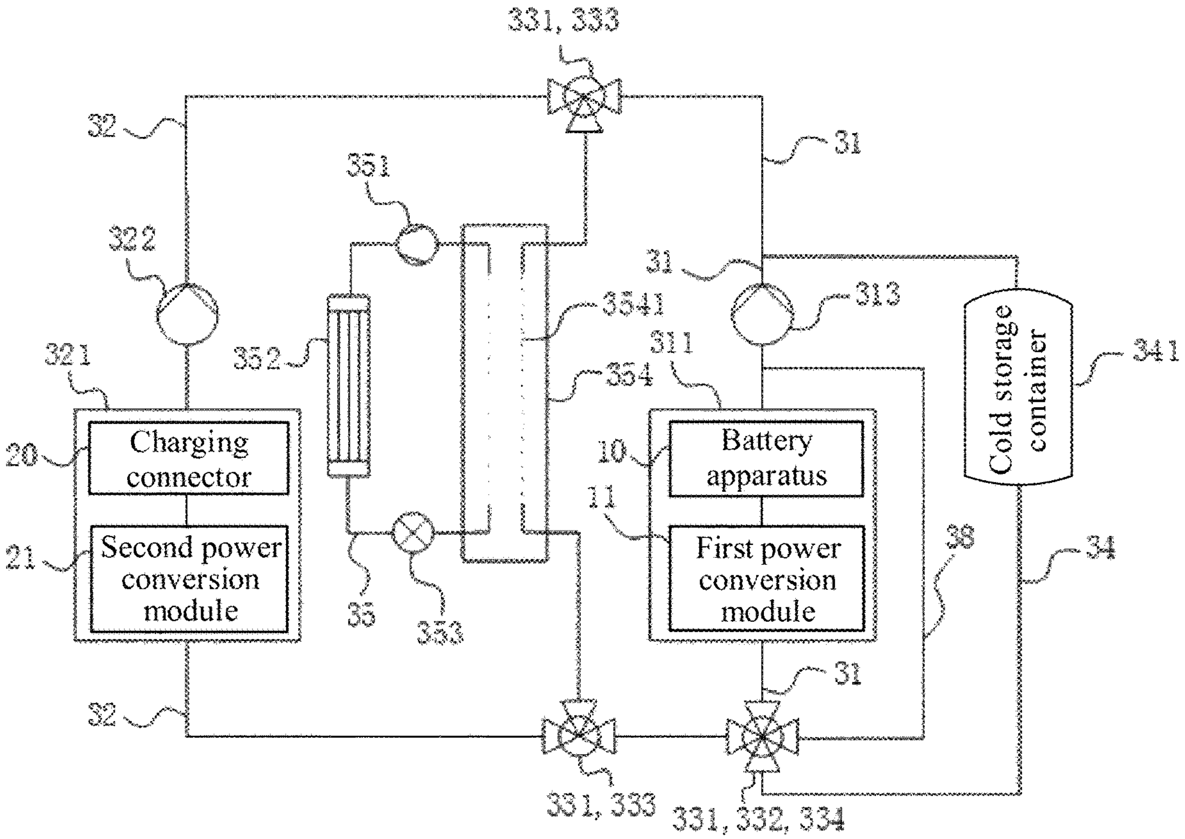
FIG. 6B is a schematic structural diagram of using a three-way liquid valve and a four-way liquid valve to implement the switching mechanism in the embodiment shown in FIG. 6A.

FIG. 5A is a schematic structural diagram of a thermal management system according to a fourth embodiment of a charging system of this disclosure. FIG. 5B is a schematic structural diagram of using a four-way liquid valve to implement the switching mechanism in the embodiment shown in FIG. 5A. FIG. 6A is a schematic structural diagram of a thermal management system according to a fifth embodiment of a charging system of this disclosure. FIG. 6B is a schematic structural diagram of using a three-way liquid valve and a four-way liquid valve to implement the switching mechanism in the embodiment shown in FIG. 6A.

Referring to FIG. 5A and FIG. 6A, in some embodiments, the thermal management system 30 further includes a cold storage flow path 34 and a second switching mechanism 332, where the cold storage flow path 34 includes a cold storage container 341, the cold storage container 341 is configured to store and release cooling capacity, and the cold storage flow path 34 is connected to the first heat exchange flow path 31 via the second switching mechanism 332 so that through an operation of switching the second switching mechanism 332, the cold storage flow path 34 and the first heat exchange flow path 31 become communicated with each other via the second switching mechanism 332 or a communication relationship between the cold storage flow path 34 and the first heat exchange flow path 31 via the second switching mechanism 332 is disconnected.

The cold storage container 341 is a container configured for storing cooling capacity and may take various forms, such as a cold storage tank. The cold storage container 341 can receive and store the heat exchange medium in a low-temperature state through the cold storage flow path 34 and maintain its low-temperature state. The cold storage container 341 can also discharge the low-temperature heat exchange medium through the cold storage flow path 34 as needed to release the cooling capacity.

The cold storage flow path 34 is connected to the first heat exchange flow path 31 via the second switching mechanism 332, where the second switching mechanism 332 can switch the communication relationship between the first heat exchange flow path 31 and the second switching mechanism 332. When it is needed to use the cold storage container 341 for cold storage or cold release, the cold storage flow path 34 is communicated with the first heat exchange flow path 31 via the second switching mechanism 332 through an operation of switching the second switching mechanism

332, forming a heat exchange medium circulation loop containing at least part of the first heat exchange flow path 31 and the cold storage flow path 34. This allows the low-temperature heat exchange medium to enter the cold storage container 341 for cold storage or guides the low-temperature heat exchange medium in the cold storage container 341 into the circulation loop to reduce the temperature of the heat exchange medium in the circulation loop.

The cooling capacity in the cold storage container 341 may be provided to the first heat exchange flow path 31 to cool the battery apparatus 10 and the first power conversion module 11, or it may be provided to the second heat exchange flow path 32 to cool the charging connector 20 and the second power conversion module 21.

For the charging system, the duration of high-current discharge during power battery charging is usually relatively short. In a cycling period, the duration of charging and dormancy of the charging system accounts for a larger proportion. When the battery apparatus 10 undergoes high-current discharge, the temperature of the battery apparatus 10 and the first power conversion module 11 may rise rapidly due to the short-term release of a large amount of energy, increasing the risk of thermal runaway. Through the release of the cooling capacity of the cold storage container 341 to cool the battery apparatus 10 and the first power conversion module 11, the temperature can be effectively reduced, improving the reliability and performance of the battery apparatus 10 and the first power conversion module 11, and effectively reducing the energy consumed by other parts of the thermal management system that provide cooling capacity.

For example, in embodiments where the cooling capacity is provided by the compression refrigeration circulation loop 35, since the cold storage container 341 provides at least part of the cooling capacity for cooling the battery apparatus 10 and the first power conversion module 11, the operating power of the compressor 351 in the compression refrigeration circulation loop 35 can be correspondingly reduced, thereby reducing overall costs and operating noise.

When the battery apparatus 10 and the charging connector 20 are not working, such as during periods of low electricity prices, the cold storage container 341 can be put into a cold storage mode to accumulate cooling capacity. The process of accumulating cooling capacity may be implemented as shown in FIG. 5A by operations of switching the first switching mechanism 331 and the second switching mechanism 332, so that the third heat exchange flow path 36 is connected to a heat exchange medium circulation loop that contains the cold storage flow path 34. This allows the third heat exchanger 361 in the third heat exchange flow path 36 to receive cooling capacity from the natural environment and store it in the cold storage container.

The process of accumulating cooling capacity may also be implemented as shown in FIG. 6A by operations of switching the second switching mechanism 332 and the third switching mechanism 333, so that the internal heat exchange flow path 3541 is connected to a heat exchange medium circulation loop that contains the cold storage flow path 34. This allows the cooling capacity to be transferred to the heat exchange medium in the internal heat exchange flow path 3541 via the evaporator 354 when the compression refrigeration circulation loop 35 is running, thereby storing the cooling capacity in the cold storage container 341 through the low-temperature heat exchange medium.

In this embodiment, through the second switching mechanism 332, the cold storage flow path 34 containing the cold storage container 341 is connected to the first heat exchange flow path 31, allowing the cold storage container 341 to accumulate cooling capacity. This enables the cooling capacity to be released to meet cooling needs in thermal management scenarios where the battery apparatus 10 and the like require rapid cooling, thereby improving the reliability of the operation of the charging system operation and reducing system energy consumption.

Referring to FIG. 5A and FIG. 6A, in some embodiments, the first heat exchange flow path 31 further includes a first pump 313, and the thermal management system 30 further includes a heat exchange bypass 38 and a fourth switching mechanism 334, where the first heat exchanger 311 is connected in parallel with the heat exchange bypass 38, one end of the heat exchange bypass 38 is connected to an inlet of the first pump 313, and another end is connected to the first heat exchange flow path 31 via the fourth switching mechanism 334 so that through an operation of switching the fourth switching mechanism 334, the heat exchange bypass 38 and the first heat exchange flow path 31 become communicated with each other via the fourth switching mechanism 334 or a communication relationship between the heat exchange bypass 38 and the first heat exchange flow path 31 via the fourth switching mechanism 334 is disconnected.

In this embodiment, the first pump 313 can drive the flow in the first heat exchange flow path 31, forming a circulation loop when the first heat exchange flow path 31 and another flow path are communicated with each other. One end of the heat exchange bypass 38 is connected to the inlet of the first pump 313. When the fourth switching mechanism 334 is switched to communicate the heat exchange bypass 38 with the first heat exchange flow path 31 via the fourth switching mechanism 334, the first pump 313 can drive the heat exchange medium to flow through the heat exchange bypass 38 to meet the needs of reducing flow resistance and simplifying the circulation loop in some working conditions.

Referring to FIG. 6A, in some embodiments, the cold storage flow path 34 is configured as, when the second switching mechanism 332 and the fourth switching mechanism 334 are both switched to a communicated state, the cold storage flow path 34, the heat exchange bypass 38, and a part of the first heat exchange flow path 31 excluding the first heat exchanger 311 form a heat exchange loop; or, when the second switching mechanism 332 is switched to a communicated state and the fourth switching mechanism 334 is switched to a disconnected state, the cold storage flow path 34 and a part of the first heat exchange flow path 31 containing the first heat exchanger 311 form a heat exchange loop.

In FIG. 5A and FIG. 6A, the heat exchange bypass 38 is in parallel with the first heat exchanger 311, and the first pump 313 in the first heat exchange flow path 31 is located outside the heat exchange bypass 38 and the first heat exchanger 311. Through the switching of the second switching mechanism 332 and the fourth switching mechanism 334, the heat exchange bypass 38 and the cold storage flow path 34 can both be connected to the first heat exchange flow path 31. At this time, based on the flow distribution relationship between the heat exchange bypass 38 and the first heat exchanger 311 implemented by the flow resistance of the first heat exchanger 311 or the fourth switching mechanism 334, a part of the heat exchange medium or all the heat exchange medium in the first heat exchange flow path 31 can flow through the heat exchange bypass 38, correspondingly reducing or avoiding the flow of the heat exchange medium into the first heat exchanger 311.

In some working conditions, such as when the current charging process does not use the battery apparatus 10 for discharge or during the cold storage process of the cold storage container 341, the battery apparatus 10 and the first power conversion module 11 do not need further cooling or heating. At this time, the heat exchange bypass 38 can be connected through the fourth switching mechanism 334, allowing the heat exchange medium to bypass the first heat exchanger 311 at least partially. This allows more heat exchange medium to be used for cooling the charging connector 20 or the cold storage process, thereby improving thermal management efficiency. This also reduces the impact of the battery apparatus 10 on the thermal management process and helps simplify the control logic.

When it is needed to perform thermal management such as cooling or heating on the battery apparatus 10 and the first power conversion module 11, the second switching mechanism 332 can be switched to a communicated state, and the fourth switching mechanism 334 can be switched to a disconnected state. In this way, the cooling capacity in the cold storage container 341 can pass through the first heat exchanger 311 under the drive of the first pump 313 to meet the cooling requirements of the battery apparatus 10 and the first power conversion module 11.

In this embodiment, depending on the operations of switching the second switching mechanism 332 and the fourth switching mechanism 334, the circulation loop where the cold storage flow path 34 is located can either flow through or bypass the first heat exchanger 311, thereby meeting different thermal management requirements.

Referring to FIG. 5A and FIG. 5B, in some embodiments, the first switching mechanism 331, the second switching mechanism 332, and the fourth switching mechanism 334, which are communicated with each other, are each implemented independently by a switching valve, or jointly implemented by a four-way liquid valve.

In FIG. 5A, one end of the first heat exchange flow path 31 is connected to the third heat exchange flow path 36 via the first switching mechanism 331, where the first switching mechanism 331 may be implemented by a switching valve controlled by electrical, hydraulic, or other means. Another end of the first heat exchange flow path 31 is connected to the first switching mechanism 331, the second switching mechanism 332, and the fourth switching mechanism 334. Here, the first switching mechanism 331, the second switching mechanism 332, and the fourth switching mechanism 334 can all adopt switching valves controlled by electrical, hydraulic, or other means to achieve the on or off state of their respective flow paths. In some embodiments, the switching valve is not limited to achieving the on or off state of a flow path but can also adjust the flow rate and flow speed through its opening degree when the flow path is in a communicated state.

In FIG. 5B, the first switching mechanism 331, the second switching mechanism 332, and the fourth switching mechanism 334 may be jointly implemented by a four-way liquid valve. The four-way liquid valve in FIG. 5B has four interfaces, which are connected to the first heat exchange flow path 31, the heat exchange bypass 38, the cold storage flow path 34, and the second heat exchange flow path 32 (or the third heat exchange flow path 36), respectively. Through operations of switching the four-way liquid valve, disconnection of any one of the four interfaces, communication between any two or any three interfaces, or communication among all four interfaces can be implemented.

In this embodiment, the first switching mechanism 331, the second switching mechanism 332, and the fourth switching mechanism 334, which are communicated with each other, can each be implemented independently by a switching valve, which can improve the control independence of each switching mechanism and facilitate maintenance; alternatively, they can be jointly implemented by a four-way liquid valve, which is conducive to simplifying the pipeline layout to save space and cost and is beneficial to simplifying the control logic to enhance control reliability.

Referring to FIG. 6A and FIG. 6B, the thermal management system 30 further includes the compression refrigeration circulation loop 35 and the third switching mechanism 333, where the compression refrigeration circulation loop 35 includes the evaporator 354, the evaporator 354 further includes the internal heat exchange flow path 3541, and the internal heat exchange flow path 3541 is connected to the first heat exchange flow path 31 via the third switching mechanism 333, where the first switching mechanism 331, the second switching mechanism 332, the third switching mechanism 333, and the fourth switching mechanism 334, which are communicated with each other, are each implemented independently by a switching valve, or jointly implemented by a three-way liquid valve and a four-way liquid valve which are connected in series.

In FIG. 6A, one end of the first heat exchange flow path 31 is connected to the third heat exchange flow path 36 and the internal heat exchange flow path 3541 through the first switching mechanism 331 and the third switching mechanism 333, respectively. The third switching mechanism 333 and the first switching mechanism 331, which are communicated with each other, can each be implemented independently through a switching valve or by be jointly implemented through a same valve. Another end of the first heat exchange flow path 31 is connected to the first switching mechanism 331, the second switching mechanism 332, the third switching mechanism 333, and the fourth switching mechanism 334. Here, the first switching mechanism 331, the second switching mechanism 332, the third switching mechanism 333, and the fourth switching mechanism 334, which are communicated with each other, can all adopt switching valves controlled by electrical, hydraulic, or other means to achieve the on or off state of their respective flow paths. In some embodiments, the switching valve is not limited to achieving the on or off state of a flow path but can also adjust the flow rate and flow speed through its opening degree when the flow path is in a communicated state.

In FIG. 6B, the third switching mechanism 333 and the first switching mechanism 331, which are communicated with each other, can be jointly implemented through a three-way liquid valve, where the three-way liquid valve has three interfaces, which are connected to the first heat exchange flow path 31, the internal heat exchange flow path 3541, and the second heat exchange flow path 32, respectively. Through operations of switching the three-way liquid valve, disconnection of any one of the three interfaces, communication between any two of the three interfaces, and communication among all three interfaces can be implemented.

The first switching mechanism 331, the second switching mechanism 332, the third switching mechanism 333, and the fourth switching mechanism 334, which are communicated with each other, can be jointly implemented through a three-way liquid valve and a four-way liquid valve which are series-connected. In FIG. 6B, the four-way liquid valve has four interfaces, which are connected to the first heat exchange flow path 31, the heat exchange bypass 38, the cold storage flow path 34, and the three-way liquid valve, respectively. The three-way liquid valve has three interfaces, which are connected to the four-way liquid valve, the second heat exchange flow path 32, and the internal heat exchange flow path 3541, respectively. In the three-way liquid valve and the four-way liquid valve, which are series-connected, all interfaces of all liquid valves are communicated with each other, or part of the interfaces are disconnected from or communicated with each other. In other embodiments, the first switching mechanism 331, the second switching mechanism 332, the third switching mechanism 333, and the fourth switching mechanism 334, which are communicated with each other, can also use other forms, such as a five-way liquid valve.

In this embodiment, the first switching mechanism 331, the second switching mechanism 332, the third switching mechanism 333, and the fourth switching mechanism 334, which are communicated with each other, can each be implemented independently by a switching valve, which can improve the control independence of each switching mechanism and facilitate maintenance; alternatively, they can be jointly implemented by a three-way liquid valve and a four-way liquid valve connected in series, which is conducive to simplifying the pipeline layout to save space and cost and is beneficial to simplifying the control logic to enhance control reliability.

Figure 7A:
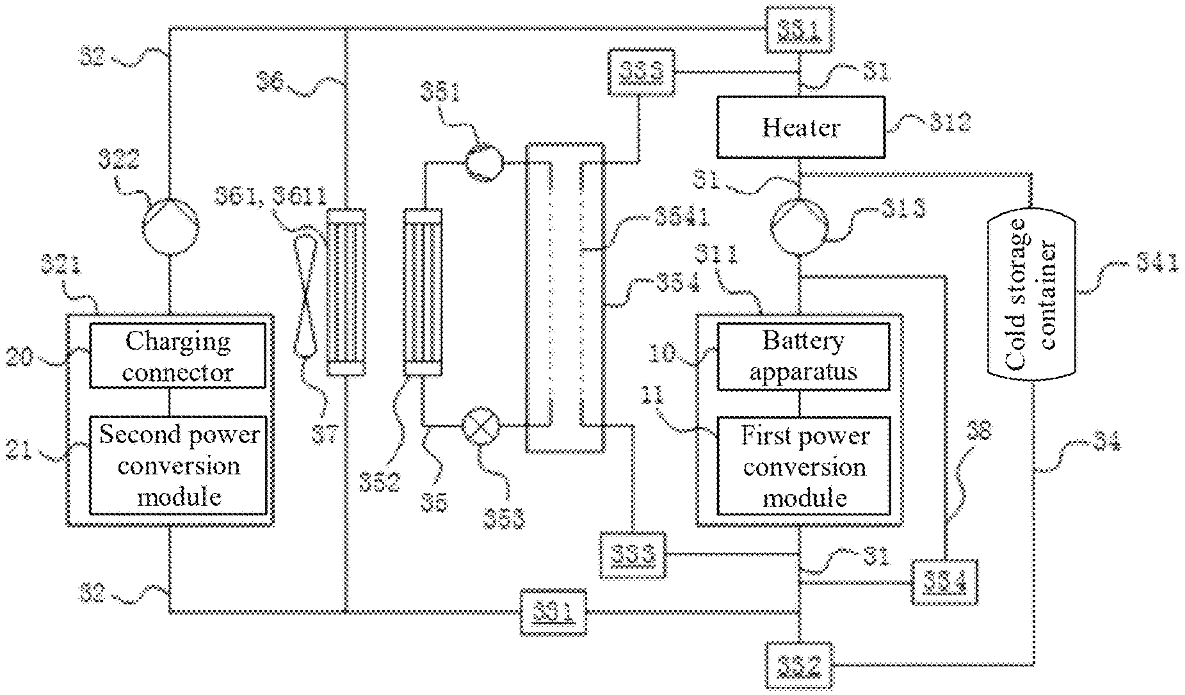
FIG. 7A is a schematic structural diagram of a thermal management system according to a sixth embodiment of a charging system of this disclosure.
Figure 7B:
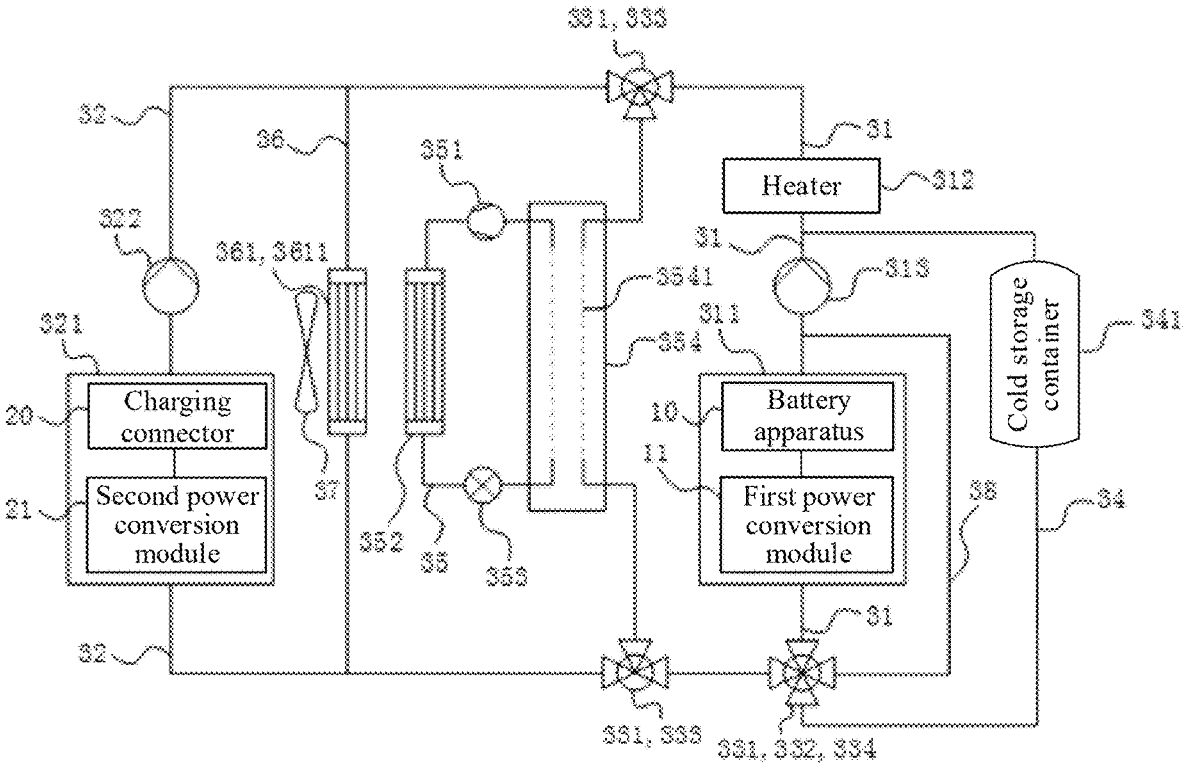
FIG. 7B is a schematic structural diagram of using a three-way liquid valve and a four-way liquid valve to implement the switching mechanism in the embodiment shown in FIG. 7A.

FIG. 7A is a schematic structural diagram of a thermal management system according to a sixth embodiment of a charging system of this disclosure. FIG. 7B is a schematic structural diagram of using a three-way liquid valve and a four-way liquid valve to implement the switching mechanism in the embodiment shown in FIG. 7A. Referring to FIG. 7A and FIG. 7B, in some embodiments, the first heat exchange flow path 31 further includes a heater 312, and the heater 312 is configured to heat a heat exchange medium flowing through the heater 312 when a heating function is enabled.

For the battery apparatus 10, excessively low temperatures can also affect the normal use of the battery apparatus 10 to some extent. Therefore, based on the actual situation, the temperature of the heat exchange medium can be increased by enabling the heater 312, so that the higher temperature heat exchange medium transfers heat to the battery apparatus 10 through the first heat exchanger 311 to raise the temperature of the battery apparatus 10.

The heater 312 may be an electric heater, a steam heater, or any other available heater. For example, the heater 312 may be a positive temperature coefficient (Positive Temperature Coefficient, PTC) heater, which is safe and has high heating efficiency.

In FIG. 7A and FIG. 7B, the heater 312 may be arranged between the first pump 313 and the first switching mechanism 331. One end of the cold storage flow path 34 may be connected to the first heat exchange flow path 31 at a position between the heater 312 and the outlet side of the first pump 313. In some other embodiments, the heater 312 may also be arranged between the first heat exchanger 311 and the first switching mechanism 331. The heater 312 is not limited to the embodiments shown in FIG. 7A and FIG. 7B and may also be arranged in the various embodiments shown in FIG. 2 to FIG. 6B. Details are not described herein again.

In this embodiment, through the heating of the heat exchange medium by the heater 312, the temperature of the battery apparatus 10 can be increased through the first heat exchanger 311 when the temperature of the battery apparatus 10 is low.

Referring to FIG. 2 to FIG. 7B, in some embodiments, the second heat exchange flow path 32 further includes a second pump 322.

The second pump 322, when turned on, can drive the heat exchange medium to flow in the second heat exchange flow path 32 so that the heat exchange medium exchanges heat with the charging connector 20 in the second heat exchanger 321. When the second pump 322 is turned off, an open circuit can be formed at the position of the second pump 322, so that the second heat exchange flow path 32 does not participate in the circulation loop of another heat exchange medium. In some other embodiments, the second heat exchange flow path 32 may not include the second pump 322, and the driving of the heat exchange medium is achieved through a driving element in another flow path.

In this embodiment, with a second pump 322 provided in the second heat exchange flow path 32, the second heat exchange flow path 32 can achieve active driving of the heat exchange medium, so as to form a circulation loop with another heat exchange flow path as needed to meet the cooling requirements of the charging connector 20.

The following describes a specific embodiment of the charging system with reference to FIG. 1 and FIG. 7B.

The charging system is used for charging a power battery of a vehicle such as an electric vehicle. The charging system includes: a battery apparatus 10, a first power conversion module 11 connected to the battery apparatus 10, a charging connector 20, a second power conversion module 21 connected to the charging connector 20, and a thermal management system 30. The battery apparatus 10 is configured to store energy and charge the power battery by releasing energy. The charging connector 20 is configured to connect to the vehicle so as to charge the power battery via the charging connector 20.

The thermal management system 30 includes a first heat exchange flow path 31, a second heat exchange flow path 32, a cold storage flow path 34, a compression refrigeration circulation loop 35, a third heat exchange flow path 36, a fan 37, a heat exchange bypass 38, a first switching mechanism 331, a second switching mechanism 332, a third switching mechanism 333, and a fourth switching mechanism 334.

The first heat exchange flow path 31 includes a first heat exchanger 311, a heater 312, and a first pump 313. The first heat exchanger 311 is used to exchange heat with the battery apparatus 10 and the first heat exchanger 311. The heater 312 is configured to heat the heat exchange medium flowing through the heater 312 when the heating function is enabled. The second heat exchange flow path 32 includes a second heat exchanger 321 and a second pump 322. The second heat exchanger 321 is used to exchange heat with the charging connector 20 and the second heat exchanger 321.

The second heat exchange flow path 32 is connected to the first heat exchange flow path 31 via the first switching mechanism 331, so that through an operation of switching the first switching mechanism 331, the second heat exchange flow path 32 and the first heat exchange flow path 31 become communicated with each other via the first switching mechanism 331 or a communication relationship between the second heat exchange flow path 32 and the first heat exchange flow path 31 via the first switching mechanism 331 is disconnected.

The third heat exchange flow path 36 further includes a third heat exchanger 361, the third heat exchange flow path 36 is connected in parallel with the second heat exchange flow path 32, and is connected to the first heat exchange flow path 31 via the first switching mechanism 331 so that through an operation of switching the first switching mechanism 331, the third heat exchange flow path 36 and the first heat exchange flow path 31 become communicated with each via the first switching mechanism 331 or a communication relationship between the third heat exchange flow path 36 and the first heat exchange flow path 31 via the first switching mechanism 331 is disconnected.

The compression refrigeration circulation loop 35 includes a condenser 352 and an evaporator 354, the evaporator 354 further includes an internal heat exchange flow path 3541, and the internal heat exchange flow path 3541 is connected to the first heat exchange flow path 31 via the third switching mechanism 333 so that through an operation of switching the third switching mechanism 333, the internal heat exchange flow path 3541 and the first heat exchange flow path 31 become communicated with each other via the third switching mechanism 333 or a communication relationship between the internal heat exchange flow path 3541 and the first heat exchange flow path 31 via the third switching mechanism 333 is disconnected. The fan 37 acts on the condenser 352 and the third heat exchanger 361.

The cold storage flow path 34 includes a cold storage container 341, the cold storage container 341 is configured to store and release cooling capacity, and the cold storage flow path 34 is connected to the first heat exchange flow path 31 via the second switching mechanism 332 so that through an operation of switching the second switching mechanism 332, the cold storage flow path 34 and the first heat exchange flow path 31 become communicated with each other via the second switching mechanism 332 or a communication relationship between the cold storage flow path 34 and the first heat exchange flow path 31 via the second switching mechanism 332 is disconnected.

The first heat exchanger 311 is connected in parallel with the heat exchange bypass 38, one end of the heat exchange bypass 38 is connected to an inlet of the first pump 313, and another end is connected to the first heat exchange flow path 31 via the fourth switching mechanism 334 so that through an operation of switching the fourth switching mechanism 334, the heat exchange bypass 38 and the first heat exchange flow path 31 become communicated with each other via the fourth switching mechanism 334 or a communication relationship between the heat exchange bypass 38 and the first heat exchange flow path 31 via the fourth switching mechanism 334 is disconnected.

Multiple embodiments in this specification are described in a progressive manner, the embodiments focus on different points, and the same or similar parts between the embodiments may refer to each other.

The embodiments of this disclosure have been described in detail. To avoid obscuring the concept of this disclosure, some well-known details in the art have not been described. Based on the above description, persons skilled in the art can fully understand how to implement the technical solutions disclosed herein.

Although some specific embodiments have been detailed in this disclosure by using examples, persons skilled in the art should understand that the foregoing examples are for illustration purposes only and not intended to limit the scope of this disclosure. Persons skilled in the art should understand that modifications can be made to the above embodiments or make equivalent replacements to some technical features without departing from the scope and spirit of this disclosure. The scope of this disclosure is defined by the appended claims.

What is claimed is:

1. A charging system for charging a power battery of a vehicle, comprising:

a battery apparatus configured to store energy and charge the power battery by releasing energy;

a charging connector configured to connect to the vehicle so as to charge the power battery via the charging connector; and a thermal management system, comprising a first heat exchange flow path, a second heat exchange flow path, a first switching mechanism, a cold storage flow path, and a second switching mechanism connecting the cold storage flow path to the first heat exchange flow path;

wherein:

the first heat exchange flow path comprises a first heat exchanger configured to exchange heat with the battery apparatus, the first heat exchanger including a first cooling plate in contact with the battery apparatus;

the second heat exchange flow path comprises a second heat exchanger configured to exchange heat with the charging connector, the second heat exchanger including a second cooling plate in contact with the charging connector;

the second heat exchange flow path is connected to the first heat exchange flow path via the first switching mechanism, so that through an operation of switching the first switching mechanism, the second heat exchange flow path and the first heat exchange flow path become communicated with each other via the first switching mechanism or a communication relationship between the second heat exchange flow path and the first heat exchange flow path via the first switching mechanism is disconnected, and a heat exchange medium flowing in the first cooling plate is configured to run into the second cooling plate in response to the second heat exchange flow path and the first heat exchange flow path becoming communicated with each other via the first switching mechanism;

the cold storage flow path comprises a cold storage container, the cold storage container is configured to store and release cooling capacity to both the first heat exchange flow path and the second heat exchange flow path, and the first heat exchange flow path and the second heat exchange flow path are connected in parallel with each other and extend between an inlet and an outlet of the cold storage container;

the first heat exchange flow path further comprises a heater and a pump, the heater is configured to heat a heat exchange medium flowing through the heater when a heating function is enabled, and the heater is connected to the first heat exchanger through the pump; and a first end of the cold storage container is connected to the first heat exchanger via the second switching mechanism, and a second end of the cold storage container is connected to a position of the first heat exchange flow path between the heater and the pump.

2. The charging system according to claim 1, further comprising:

a first power conversion module connected to the battery apparatus and exchanging heat with the first heat exchanger; and/or a second power conversion module connected to the charging connector and exchanging heat with the second heat exchanger.

3. The charging system according to claim 1, wherein the thermal management system further comprises a third heat exchange flow path, wherein the third heat exchange flow path further comprises a third heat exchanger, the third heat exchange flow path is connected in parallel with the second heat exchange flow path, and is connected to the first heat exchange flow path via the first switching mechanism so that through an operation of switching the first switching mechanism, the third heat exchange flow path and the first heat exchange flow path become communicated with each via the first switching mechanism or a communication relationship between the third heat exchange flow path and the first heat exchange flow path via the first switching mechanism is disconnected.

4. The charging system according to claim 3, wherein the first heat exchange flow path is configured such that, when the first switching mechanism is switched to a communicated state, at least part of the first heat exchange flow path forms a heat exchange loop with the third heat exchange flow path.

5. The charging system according to claim 3, wherein the thermal management system further comprises a compression refrigeration circulation loop and a third switching mechanism, the compression refrigeration circulation loop comprises a condenser and an evaporator, the evaporator further comprises an internal heat exchange flow path, and the internal heat exchange flow path is connected to the first heat exchange flow path via the third switching mechanism; and the thermal management system further comprises a fan, and the fan acts on the condenser and the third heat exchanger.

6. The charging system according to claim 1, wherein the thermal management system further comprises a compression refrigeration circulation loop and a third switching mechanism, wherein the compression refrigeration circulation loop comprises an evaporator, the evaporator further comprises an internal heat exchange flow path, and the internal heat exchange flow path is connected to the first heat exchange flow path via the third switching mechanism so that through an operation of switching the third switching mechanism, the internal heat exchange flow path and the first heat exchange flow path become communicated with each other via the third switching mechanism or a communication relationship between the internal heat exchange flow path and the first heat exchange flow path via the third switching mechanism is disconnected.

7. The charging system according to claim 6, wherein the first heat exchange flow path is configured such that, when the third switching mechanism is switched to a communicated state, at least part of the first heat exchange flow path forms a heat exchange loop with the internal heat exchange flow path.

8. The charging system according to claim 6, wherein the third switching mechanism and the first switching mechanism, which are communicated with each other, are each implemented independently by a switching valve, or jointly implemented by a three-way liquid valve.

9. The charging system according to claim 1, wherein the cold storage flow path is connected to the first heat exchange flow path via the second switching mechanism so that through an operation of switching the second switching mechanism, the cold storage flow path and the first heat exchange flow path become communicated with each other via the second switching mechanism or a communication relationship between the cold storage flow path and the first heat exchange flow path via the second switching mechanism is disconnected.

10. The charging system according to claim 9, wherein the thermal management system further comprises a heat exchange bypass and a fourth switching mechanism, the first heat exchanger is connected in parallel with the heat exchange bypass, one end of the heat exchange bypass is connected to an inlet of the pump, and another end of the heat exchange bypass is connected to the first heat exchange flow path via the fourth switching mechanism so that through an operation of switching the fourth switching mechanism, the heat exchange bypass and the first heat exchange flow path become communicated with each other via the fourth switching mechanism or a communication relationship between the heat exchange bypass and the first heat exchange flow path via the fourth switching mechanism is disconnected, the cold storage flow path is configured as, when the second switching mechanism and the fourth switching mechanism are both switched to a communicated state, the cold storage flow path, the heat exchange bypass, and a part of the first heat exchange flow path excluding the first heat exchanger form a heat exchange loop; or, when the second switching mechanism is switched to a communicated state and the fourth switching mechanism is switched to a disconnected state, the cold storage flow path and a part of the first heat exchange flow path containing the first heat exchanger form a heat exchange loop.

11. The charging system according to claim 9, wherein the thermal management system further comprises a heat exchange bypass and a fourth switching mechanism, the first heat exchanger is connected in parallel with the heat exchange bypass, one end of the heat exchange bypass is connected to an inlet of the pump, and another end of the heat exchange bypass is connected to the first heat exchange flow path via the fourth switching mechanism so that through an operation of switching the fourth switching mechanism, the heat exchange bypass and the first heat exchange flow path become communicated with each other via the fourth switching mechanism or a communication relationship between the heat exchange bypass and the first heat exchange flow path via the fourth switching mechanism is disconnected, the first switching mechanism, the second switching mechanism, and the fourth switching mechanism which are communicated with each other are each implemented independently by a switching valve, or jointly implemented by a four-way liquid valve.

12. The charging system according to claim 9, wherein the thermal management system further comprises a heat exchange bypass and a fourth switching mechanism, the first heat exchanger is connected in parallel with the heat exchange bypass, one end of the heat exchange bypass is connected to an inlet of the pump, and another end of the heat exchange bypass is connected to the first heat exchange flow path via the fourth switching mechanism so that through an operation of switching the fourth switching mechanism, the heat exchange bypass and the first heat exchange flow path become communicated with each other via the fourth switching mechanism or a communication relationship between the heat exchange bypass and the first heat exchange flow path via the fourth switching mechanism is disconnected, the thermal management system further comprises a compression refrigeration circulation loop and a third switching mechanism, wherein the compression refrigeration circulation loop comprises an evaporator, the evaporator further comprises an internal heat exchange flow path, and the internal heat exchange flow path is connected to the first heat exchange flow path via the third switching mechanism, wherein the first switching mechanism, the second switching mechanism, the third switching mechanism, and the fourth switching mechanism, which are communicated with each other, are each implemented independently by a switching valve, or jointly implemented by a three-way liquid valve and a four-way liquid valve which are connected in series.

13. The charging system according to claim 1, wherein one end of the second heat exchange flow path is connected to one end of the first heat exchange flow path via the first switching mechanism, and another end of the second heat exchange flow path is connected to another end of the first heat exchange flow path via the first switching mechanism.

14. The charging system according to claim 1, wherein:

the thermal management system further comprises a compression refrigeration circulation loop and a third switching mechanism;

the compression refrigeration circulation loop is connected to the first heat exchange flow path via the third switching mechanism, so that through an operation of switching the third switching mechanism, an internal heat exchange flow path of the compression refrigeration circulation loop and the first heat exchange flow path become communicated with each other via the third switching mechanism or a communication relationship between the internal heat exchange flow path and the first heat exchange flow path via the third switching mechanism is disconnected; and the third switching mechanism and the first switching mechanism are communicated with each other and are jointly implemented by a three-way liquid valve.

15. The charging system according to claim 1, wherein the pump is a first pump, the second heat exchange flow path further comprises a second pump, a first end of the cold storage container is connected to a first end of the second heat exchanger via the second switching mechanism, and a second end of the cold storage container is connected to a second end of the second heat exchanger sequentially through the first switching mechanism and the second pump.

16. A charging system for charging a power battery of a vehicle, comprising:

a battery apparatus configured to store energy and charge the power battery by releasing energy;

a charging connector configured to connect to the vehicle so as to charge the power battery via the charging connector; and a thermal management system, comprising a first heat exchange flow path, a second heat exchange flow path, a first switching mechanism, a cold storage flow path, and a second switching mechanism;

wherein:

the first heat exchange flow path comprises a first heat exchanger configured to exchange heat with the battery apparatus, and a heater configured to heat a heat exchange medium flowing through the heater when a heating function is enabled, the first heat exchanger including a first cooling plate in contact with the battery apparatus;

the second heat exchange flow path comprises a pump and a second heat exchanger configured to exchange heat with the charging connector, the second heat exchanger including a second cooling plate in contact with the charging connector;

the second heat exchange flow path is connected to the first heat exchange flow path via the first switching mechanism, so that through an operation of switching the first switching mechanism, the second heat exchange flow path and the first heat exchange flow path become communicated with each other via the first switching mechanism or a communication relationship between the second heat exchange flow path and the first heat exchange flow path via the first switching mechanism is disconnected, and a heat exchange medium flowing in the first cooling plate is configured to run into the second cooling plate in response to the second heat exchange flow path and the first heat exchange flow path becoming communicated with each other via the first switching mechanism; and the cold storage flow path comprises a cold storage container, the cold storage container is configured to store and release cooling capacity, a first end of the cold storage container is connected to a first end of the second heat exchanger via the second switching mechanism, and a second end of the cold storage container is connected to a second end of the second heat exchanger sequentially through the heater, the first switching mechanism, and the pump.

17. A charging system for charging a power battery of a vehicle, comprising:

a battery apparatus configured to store energy and charge the power battery by releasing energy;

a charging connector configured to connect to the vehicle so as to charge the power battery via the charging connector; and a thermal management system, comprising a first heat exchange flow path, a second heat exchange flow path, a first switching mechanism, a cold storage flow path, and a second switching mechanism connecting the cold storage flow path to the first heat exchange flow path;

wherein:

the first heat exchange flow path comprises a first heat exchanger configured to exchange heat with the battery apparatus, the first heat exchanger including a first cooling plate in contact with the battery apparatus;

the second heat exchange flow path comprises a second heat exchanger configured to exchange heat with the charging connector, the second heat exchanger including a second cooling plate in contact with the charging connector;

the second heat exchange flow path is connected to the first heat exchange flow path via the first switching mechanism, so that through an operation of switching the first switching mechanism, the second heat exchange flow path and the first heat exchange flow path become communicated with each other via the first switching mechanism or a communication relationship between the second heat exchange flow path and the first heat exchange flow path via the first switching mechanism is disconnected, and a heat exchange medium flowing in the first cooling plate is configured to run into the second cooling plate in response to the second heat exchange flow path and the first heat exchange flow path becoming communicated with each other via the first switching mechanism;

the cold storage flow path comprises a cold storage container, the cold storage container is configured to store and release cooling capacity to both the first heat exchange flow path and the second heat exchange flow path, and the first heat exchange flow path and the second heat exchange flow path are connected in parallel with each other and extend between an inlet and an outlet of the cold storage container; and the second heat exchange flow path further comprises a pump, a first end of the cold storage container is connected to a first end of the second heat exchanger via the second switching mechanism, and a second end of the cold storage container is connected to a second end of the second heat exchanger sequentially through the first switching mechanism and the pump.

* * * * *